(12) United States Patent
Heu

(10) Patent No.: US 11,163,135 B2
(45) Date of Patent: Nov. 2, 2021

(54) LENS ASSEMBLY AND ELECTRONIC DEVICE INCLUDING THE SAME

(71) Applicant: Samsung Electronics Co., Ltd., Gyeonggi-do (KR)

(72) Inventor: Min Heu, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 16/590,559

(22) Filed: Oct. 2, 2019

(65) Prior Publication Data

US 2020/0103619 A1 Apr. 2, 2020

(30) Foreign Application Priority Data

Oct. 2, 2018 (KR) .......................... 10-2018-0117887

(51) Int. Cl.
*G02B 9/62* (2006.01)
*G02B 13/18* (2006.01)
(Continued)

(52) U.S. Cl.
CPC ................. *G02B 9/62* (2013.01); *G02B 5/20* (2013.01); *G02B 13/0045* (2013.01);
(Continued)

(58) Field of Classification Search
CPC ............ G02B 13/0045; G02B 27/0025; G02B 13/18; G02B 5/005; G02B 13/02;
(Continued)

(56) References Cited

U.S. PATENT DOCUMENTS

| 4,094,588 A | 6/1978 | Nakagawa |
| 6,233,101 B1 | 5/2001 | Takatsuki |

(Continued)

FOREIGN PATENT DOCUMENTS

| JP | H11-271610 A | 10/1999 |
| JP | 2000-171701 A | 6/2000 |

(Continued)

OTHER PUBLICATIONS

International Search Report dated Jan. 14, 2020, for PCT/KR2019/012955; also written opinion, both in English.
(Continued)

*Primary Examiner* — Evelyn A Lester
(74) *Attorney, Agent, or Firm* — Cha & Reiter, LLC

(57) ABSTRACT

One or more embodiments of the disclosure relate to, for example, lens assemblies which may function not only as a wide angle lens but also as a telephoto lens. According to an embodiment, a lens assembly comprises a first lens having a positive refractive power, the first lens having a convex surface in a first direction, a second lens having a positive refractive power, the second lens having a convex surface in the first direction, a third lens having a negative refractive power, the third lens having a concave surface in a second direction opposite to the first direction, a fourth lens having a concave surface in the first direction and disposed to face the concave surface of the third lens, and a fifth lens having a positive refractive power, the fifth lens having a convex surface in the second direction. Other embodiments are also disclosed.

20 Claims, 23 Drawing Sheets

(51) Int. Cl.
  *G02B 13/00*  (2006.01)
  *H04N 5/225*  (2006.01)
  *G02B 27/00*  (2006.01)
  *G02B 5/20*  (2006.01)
  *G02B 13/02*  (2006.01)
  *G02B 5/00*  (2006.01)

(52) U.S. Cl.
  CPC ............ *G02B 13/02* (2013.01); *G02B 13/18* (2013.01); *G02B 27/0025* (2013.01); *H04N 5/2257* (2013.01); *H04N 5/2258* (2013.01); *G02B 5/005* (2013.01)

(58) Field of Classification Search
  CPC .......... G02B 5/20; G02B 9/62; H04N 5/2257; H04N 5/2258
  USPC ................ 359/714, 740, 763, 764, 767, 768
  See application file for complete search history.

(56) References Cited

U.S. PATENT DOCUMENTS

| | | | |
|---|---|---|---|
| 9,402,032 | B2 | 7/2016 | Dror et al. |
| 2013/0050846 | A1 | 2/2013 | Huang |
| 2014/0153114 | A1* | 6/2014 | Suzuki .................... G02B 9/60 359/714 |
| 2015/0177483 | A1 | 6/2015 | You |
| 2015/0226941 | A1* | 8/2015 | Fukaya .................... G02B 9/64 359/708 |
| 2016/0062081 | A1 | 3/2016 | Kubota et al. |
| 2016/0274334 | A1* | 9/2016 | Lee .................... G02B 13/0045 |
| 2017/0023769 | A1 | 1/2017 | Jo |
| 2017/0115471 | A1 | 4/2017 | Shinohara |
| 2017/0123187 | A1* | 5/2017 | Heu .................... G02B 27/0025 |
| 2017/0322391 | A1* | 11/2017 | Kang ................. G02B 13/0045 |
| 2018/0067333 | A1 | 3/2018 | Ishibashi |
| 2018/0164544 | A1* | 6/2018 | Kwak .................... G02B 9/60 |
| 2019/0094497 | A1 | 3/2019 | Huang et al. |
| 2020/0371315 | A1* | 11/2020 | Guan ................. G02B 27/0025 |

FOREIGN PATENT DOCUMENTS

| | | |
|---|---|---|
| JP | 2011-175123 A | 9/2011 |
| JP | 2012-230340 A | 11/2012 |
| JP | 2015-72405 A | 4/2015 |
| KR | 10-1652849 B1 | 8/2016 |
| KR | 10-1762006 B1 | 7/2017 |
| TW | 1637207 B | 10/2018 |

OTHER PUBLICATIONS

European Search Report dated Jul. 5, 2021 For Patent KR 19868241.1-1020 to Samsung Electronics.

* cited by examiner

LENS ASSEMBLY AND ELECTRONIC DEVICE INCLUDING THE SAME

CROSS-REFERENCE TO RELATED APPLICATION(S)

This application is based on and claims priority under 35 U.S.C. 119 to Korean Patent Application No. 10-2018-0117887, filed on Oct. 2, 2018, in the Korean Intellectual Property Office, the disclosure of which is herein incorporated by reference in its entirety.

BACKGROUND

Field

One or more embodiments of the disclosure generally relate to a lens assembly that may be installed in a small or mobile electronic device, e.g., a portable terminal, and more specifically, one or more embodiments may relate to a lens assembly with a wide view angle that may function as a telephoto lens.

Description of Related Art

Optical devices, e.g., cameras capable of capturing images or videos have been widely used. Conventional film-type optical devices have been recently replaced with digital cameras or video cameras with solid image sensors, such as charge coupled device (CCD) or complementary metal-oxide semiconductor (CMOS) devices because optical devices with solid image sensors (CCD or CMOS) may easily save, copy, or transmit images as compared to film-type optical devices.

To obtain high-quality images and/or videos, a plurality of lenses may be used. A lens assembly with a combination of multiple lenses may have a lower F-number and smaller aberration and thus enables higher-quality (higher-resolution) capture of images and/or videos. Obtaining a lower F number and smaller aberration, that is, higher resolution and brighter images, may call for multiple lenses. These optical devices may be used in devices specific for image capturing, such as standalone digital cameras, as well as compact electronic devices such as portable wireless terminals.

Optical devices nowadays have become an essential component for portable electronic devices that provide various services and functions, and high-performance optical devices may be effective in leading to purchase of portable electronic devices.

The above information is presented as background information only to assist with an understanding of the disclosure. No determination has been made, and no assertion is made, as to whether any of the above might be applicable as prior art with regard to the disclosure.

SUMMARY

With more demand for high-performance optical devices in portable electronic devices, single-focus lenses, such as wide-angle lenses, have gained increasing popularity. A type of known wide-angle lenses are so-called retrofocus-type (reverse telephoto-type) lenses which have a back focal length and consist of a first lens group with a negative refractive index and a second lens group with a positive refractive index ordered from the object whose image is captured. Such a retrofocus-type lens system allows for long back focal length and wider view angle. Users prefer optical devices which implement high-optical performance but are small in size. However, retrofocus-type lenses may not be slimmed down to the extent required for mobile devices due to their long focal length. This renders it difficult to adopt retrofocus-type lenses in portable electronic devices. Further, retrofocus-type lenses exhibit increased aberration due to their overly long back focal length and concave surface with strong refractive power in the center and may thus deteriorate the resolution of the imaging plane.

Recently, there has been more demand for optical devices for use in portable electronic devices that implement telephoto as well as wide-angle (e.g., super wide view angle) lenses. However, because the thickness of the compact electronic devices are limited, it may be hard to design a sufficient telephoto ratio for the telephoto lens because the thickness of the electronic device poses as a limit on the whole length of the lens assembly. Here, the "limit on the whole length of a lens assembly" may mean that the number of lenses included in the lens assembly is limited. The limit on the number of lenses included in the lens assembly may render it difficult to obtain high-quality images and/or videos. For example, with the number of lenses is limited, it may be hard to manufacture a lens assembly with a low F-number and smaller aberration.

In accordance with one or more embodiments, a lens assembly comprises a first lens having a positive refractive power, the first lens having a convex surface in a first direction, a second lens having a positive refractive power, the second lens having a convex surface in the first direction, a third lens having a negative refractive power, the third lens having a concave surface in a second direction opposite to the first direction, a fourth lens having a concave surface in the first direction and disposed to face the concave surface of the third lens, and a fifth lens having a positive refractive power, the fifth lens having a convex surface in the second direction.

In accordance with one or more embodiments, an electronic device comprises a lens assembly having a plurality of lenses, an image sensor, and an image signal processor configured to store or output an image obtained by the image sensor based on light transmitted through the plurality of lenses, wherein the lens assembly includes a first lens having a positive refractive power, the first lens having a convex surface in a first direction; a second lens having a positive refractive power, the second lens having a convex surface in the first direction, a third lens having a negative refractive power, the third lens having a concave surface in a second direction opposite to the first direction, a fourth lens having a concave surface in the first direction and disposed to face the concave surface of the third lens, and a fifth lens having a positive refractive power, the fifth lens having a convex surface in the second direction.

The lens assembly and the electronic device may meet Equation 1 and Equation 2 as follows:

$$8 < \frac{TTL}{\mathrm{Tan}\theta} < 25 \qquad \text{[Equation 1]}$$

$$0.3 < \frac{\mathrm{Sag\_13}}{Y} < 0.8 \qquad \text{[Equation 2]}$$

where TTL is a whole length of the lens assembly, θ is a half view angle of the lens assembly, Sag_13 is a sum of an effective distance on a sagittal plane of the first lens and an effective distance on a sagittal plane of the second lens, and Y is half of a diagonal length of an image sensor configured to detect an object image which is sequentially transmitted through the first lens, the second lens, the third lens, the fourth lens, and the fifth lens.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1A:
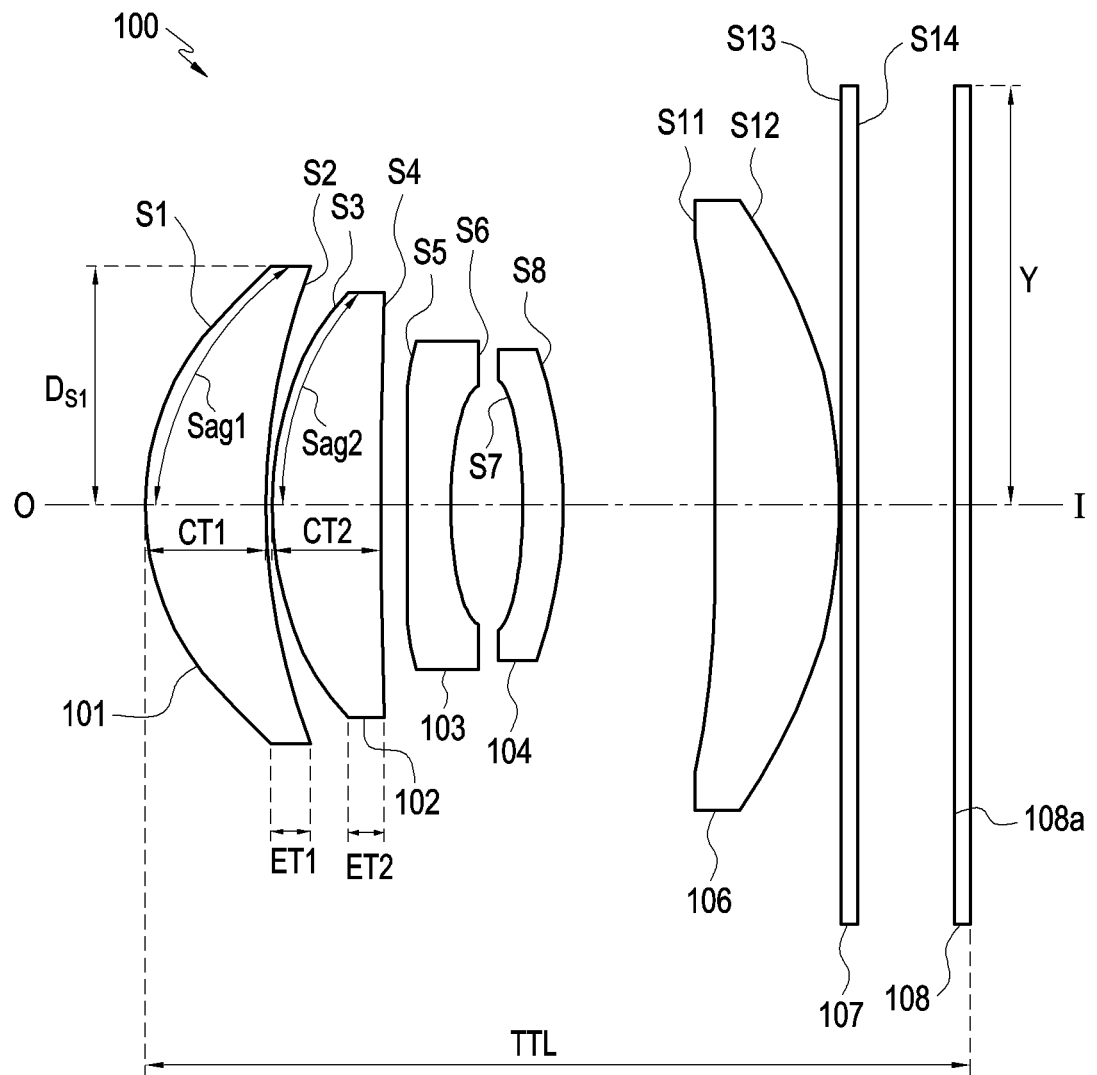
FIG. 1A is a view illustrating a configuration of a lens assembly according to an embodiment.

Hereinafter, embodiments of the disclosure are described with reference to the accompanying drawings. However, it should be appreciated that the disclosure is not limited to the embodiments and the terminology used herein, and all changes and/or equivalents or replacements thereto also belong to the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a dryer, an air cleaner, a set-top box, a home automation control panel, a security control panel, a TV box (e.g., Samsung HomeSync™, Apple TV', or Google TV™), a gaming console (Xbox™, PlayStation™), an electronic dictionary, an electronic key, a camcorder, or an electronic picture frame.

According to an embodiment of the disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may be at least one of part of a piece of furniture, a building/structure or vehicle, an electronic board, an electronic signature receiving device, a projector, or various measurement devices (e.g., devices for measuring water, electricity, gas, or electromagnetic waves). According to embodiments of the disclosure, the electronic device may be flexible or may be a combination of the above-enumerated electronic devices. According to an embodiment of the disclosure, the electronic device is not limited to the above-listed embodiments. As used herein, the term "user" may denote a human or another device (e.g., an artificial intelligent electronic device) using the electronic device. According to an embodiment of the disclosure, the electronic device is not limited to the above-listed embodiments.

According to one or more embodiments, representative examples of the electronic device may include optical devices (e.g., cameras), and the following description may be based on the hypothesis that a lens assembly is equipped in an optical device according to an embodiment.

Although limits or limitations to some numbers may be proposed herein, it should be noted that various embodiments of the disclosure are not limited by such numbers as long as the numbers are not shown in the claims.

According to one or more embodiments of the disclosure, there may be provided a compact lens assembly with a small number (e.g., five) of lenses and an electronic device including the lens assembly.

According to one or more embodiments of the disclosure, there may be provided a lens assembly, which may exhibit good optical characteristics (e.g., aberration, wide angle, and/or brightness properties) albeit equipped with a small number (e.g., five) of lenses and an electronic device including the lens assembly.

According to one or more embodiments of the disclosure, there may be provided a lens assembly, which may exhibit good optical characteristics despite its reduced number (e.g., five) of lenses, and the electronic device equipped with the same may obtain high-resolution images and/or videos.

Figure 1B:
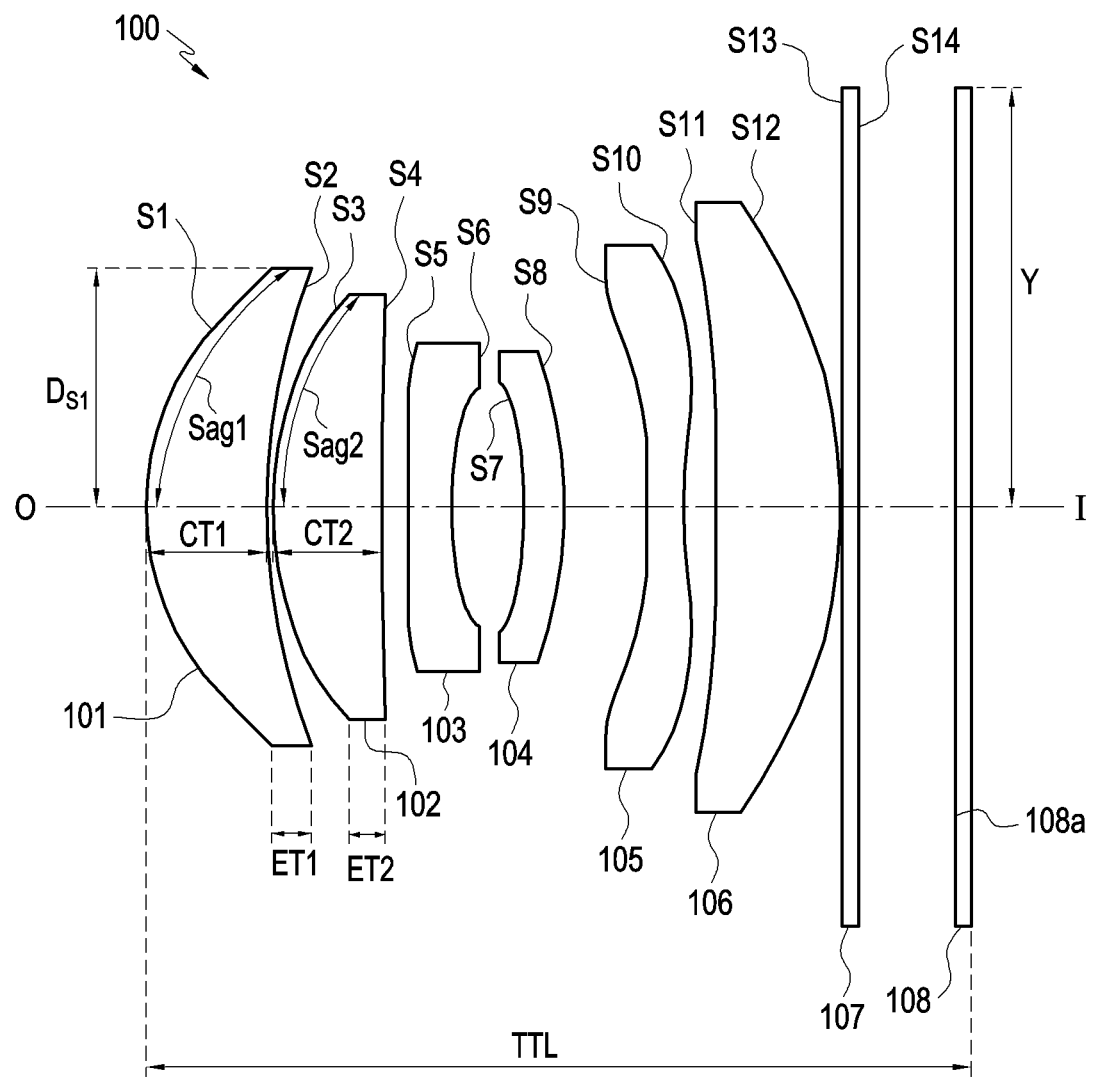
FIG. 1B is a view illustrating a configuration of lens assembly according to an embodiment different from the embodiment of FIG. 1A.

FIG. 1A is a view illustrating a configuration of a lens assembly 100 according to an embodiment. FIG. 1B is a view illustrating a configuration of a lens assembly 100 according to an embodiment different from the embodiment of FIG. 1A.

Referring to FIG. 1A, according to an embodiment, a lens assembly 100 may include a plurality of lenses (e.g., 101, 102, 103, 104, and 106) and an image sensor 108.

According to an embodiment, the image sensor 108 may be installed in an electronic device. The lens assembly 100 including the plurality of lenses may be mounted in the optical device and/or electronic device corresponding to the image sensor 108. For example, although in the example shown in FIG. 1A the image sensor 108 is provided in the lens assembly 100, the instant disclosure is not so limited.

According to an embodiment, the image sensor 108 may be a sensor that is mounted on a circuit board (not shown) and is aligned with the optical axis O-I and may respond to light. The image sensor 108 may include, e.g., a CMOS or CCD sensor. The image sensor 108, however, is not limited thereto but may rather include various elements that convert light, e.g., an object image, into an electrical image signal. The image sensor 108 may detect brightness, contrast ratio information, or color information about the object from which light is transmitted or reflected through the plurality of lenses (e.g., 101, 102, 103, 104, and 106), thereby obtaining an image for the object.

According to an embodiment, the lenses of the lens assembly 100 may include a plastic lens, and the lens assembly 100 may have a view angle of about 70 degrees through the combination of the lenses.

According to an embodiment, the lens assembly may have an optical axis O-I from the object side O to an image side I, where the object side O is closer to the object whose image is to be captured. In describing the configuration of each lens below, "object side" may denote the side closer to the object, and "image side" may denote the side closer to the imaging plane 108a where an image is formed. The "object side-facing surface" of a lens may denote a surface towards the object on the optical axis O-I, and may be the left (or front) surface of the lens as viewed from the drawings, and the "image side-facing surface" of the lens may denote a surface towards the imaging plane 108a on the optical axis O-I, and may be the right (or rear) surface of the lens as viewed from the drawings. The imaging plane 108a may be a portion where, e.g., an image capturing element or image sensor 108 is disposed and an image is formed.

According to an embodiment, when a lens (e.g., a first lens) includes an object side (O)-facing surface, the object side (O)-facing surface may be said to face a first direction. When a lens (e.g., the first lens) has an image side (I)-facing surface, the image side (I)-facing surface may be said to face a second direction which is opposite to the first direction.

Referring to FIG. 1A, according to an embodiment, the lens assembly 100 may include a first lens 101, a second lens 102, a third lens 103, a fourth lens 104, and a fifth lens 106 as the plurality of lenses (e.g., 101, 102, 103, 104, and 106) sequentially arranged along the optical axis O-I from the object to the imaging plane (e.g., the direction form the object O of FIG. 1 to the image I). The plurality of lenses (e.g., 101, 102, 103, 104, and 106) may be aligned with the image sensor 108 and the optical axis.

According to an embodiment, as shown in FIG. 1B, the lens assembly 100 may further include at least one sixth lens 105 between the fourth lens 104 and the fifth lens 106. Referring to FIG. 1B, according to an embodiment, one sixth lens 105 is disposed between the fourth lens 104 and the fifth lens 106. The number of lenses disposed between the fourth lens 104 and the fifth lens 106 may be varied depending on the volume and optical performance required for the optical device where the lens assembly 100 is mounted.

The following description focuses primarily on the plurality of lenses (e.g., 101, 102, 103, 104, 105, and 106) including the sixth lens 105. The description of the following embodiments may also apply to lens assemblies (e.g., the lens assembly of FIG. 1A) including a plurality of lenses (e.g., 101, 102, 103, 104, and 106) but not the sixth lens 105.

According to an embodiment, in describing the plurality of lenses (e.g., 101, 102, 103, 104, 105, and 106), the portion of each lens, which is close to the optical axis O-I may be referred to as a chief portion, and the portion further from the optical axis O-I (or around the edge of the lens) may be referred to as a marginal portion. For example, the chief portion may be the portion of the first lens 101 that crosses the optical axis O-I. The marginal portion may be the portion of the first lens 101 that is a predetermined distance away from the optical axis. The marginal portion may include an end portion of the lens which is positioned farthest from the optical axis O-I of the lens.

According to an embodiment, the first lens 101 and the second lens 102 may have a positive refractive power. The third lens 103 and the fourth lens 104 may have a negative refractive power. The fifth lens 106 may have a positive refractive power.

According to an embodiment, at least one sixth lens 105 placed between the fourth lens 104 and the fifth lens 106 may have a negative refractive power. According to the embodiment of FIG. 1B, one sixth lens 105 may have a negative refractive power. Alternatively, when two or more sixth lenses 105 are placed between the fourth lens 104 and the fifth lens 106, the combination of the two or more sixth lenses 105 between the fourth lens 104 and the fifth lens 106 may have a negative refractive power.

In the above-described embodiments, if light parallel with the optical axis O-I is incident onto the lens with a positive refractive power, the light, after passing through the lens, may be focused. For example, the lens with a positive refractive power may be a convex lens. In contrast, if parallel light is incident onto the lens with a negative refractive power, the light, after passing through the lens, may be dispersed. For example, the lens with a negative refractive power may be a concave lens. In the following example described, the plurality of lenses included in the lens assembly may be the first lens 101, the second lens 102, the third lens 103, the fourth lens 104, the fifth lens 106, and one sixth lens 105. According to an embodiment, the object side (O)-facing surface S1 of the first lens 101 may be convex, and the object side (O)-facing surface S3 of the second lens 102 may also be convex. According to an embodiment, as at least one of the first lens 101 or the second lens 102 is a meniscus lens whose image side (I)-facing surface is concave. As such, coma aberration and astigmatism, which are phenomena where an unclear image is formed through the marginal portion of the lens, may be effectively removed. For example, the first lens 101 may be a meniscus lens whose object side (O)-facing surface S1 is convex and the image side (I)-facing surface S2 is concave, and second lens 102 may be a flat lens whose object side (O)-facing surface S3 is convex, and image side (1)-facing surface S4 is flat.

According to an embodiment, the first lens 101 and the second lens 102 may be large aperture lenses which are relatively larger in effective diameter than the third lens 103 and the fourth lens 104 described below. For example, the effective diameter of the first lens 101 may be larger than the effective diameter of the second lens 102, and the effective diameter of the second lens 102 may be larger than the effective diameter of the third lens 103. Since these lenses need to be installed in the limited space of the optical device and/or electronic device, the first lens 101 and the second lens 102 may have very short focal lengths. Providing a strong positive refractive power through the first lens 101 and the second lens 102 allows the lens assembly to have a short whole length. Providing a strong positive refractive power through the first lens 101 and the second lens 102 may increase the resolution of the image or video imaged by the light transmitted through the marginal portion and shorten the travel path of the light.

According to an embodiment, at least one of the surfaces S1, S2, S3, and S4 of the first lens 101 and the second lens 102 may be an aspheric surface. As described below, the first lens 102 and the second lens 102 may have parameters Sag 1 and Sag 3 regarding the effective distances of the first lens 101 and the second lens 102. These parameters Sag 1 and Sag 3 may be in a designated range with respect to the parameter Y regarding the length of the image sensor 108. Thus, compact lenses may be implemented, and the view angle requirement for telephoto lenses may be met. The spherical aberration which may be caused by the effective distance of the first lens 101 and the second lens 102 may be prevented by implementing at least one of the surfaces S1, S2, S3, and S4 of the first lens 101 and the second lens 102 as an aspheric surface. According to an embodiment, Tables 1, 4, 7, 10, and 12 are related to examples in which both the surfaces S1 and S2 of the first lens 101 are aspheric surfaces. Except for the surface S4 of the second lens 102 as shown in Table 10, all of the surfaces S1, S2, S3, and S4 of the second lens 102 as shown in Tables 1, 4, 7, 10, and 12 are aspheric surfaces in those examples.

According to an embodiment, the image side (I)-facing surface S6 of the third lens 103 and the object side (O)-facing surface S7 of the fourth lens 104 may be concave surfaces. In other words, two lenses (e.g., the third lens 103 and the fourth lens 104) whose respective concave surfaces face each other may be placed behind the first lens 101 and the second lens 102. According to an embodiment, as the third lens 103 has a negative refractive power, the spherical aberration which may be caused by the first lens 101 and the second lens 102 formed with a large aperture may be compensated effectively.

According to an embodiment, the third lens 103 and the fourth lens 104 may be smaller in size than the first lens 101 and the second lens 102. The first lens 101 and the second lens 102 are formed to have a relatively large aperture and, thus, their focusing performance and telephoto ratio may be increased. As the first lens 101 and the second lens 102 are provided with a strong positive refractive power, the effective diameter of the third lens 103 and the fourth lens 104 may be minimized, so that the lens assembly may be made more compact.

According to an embodiment, the object side (O)-facing surface S5 of the third lens 103 and the image side (I)-facing surface S8 of the fourth lens 104 each may be flat or convex. For example, the image side (I)-facing surface S5 of the third lens 103 may be convex, the image side (I)-facing surface S6 of the third lens 103 may be concave, the object side (O)-facing surface S7 of the fourth lens 104 may be concave, and the image side (I)-facing surface S8 of the fourth lens 104 may be convex.

According to an embodiment, spherical aberration may be compensated by the negative refractive power of the image side (I)-facing surface of the third lens 103.

According to an embodiment, spherical aberration may further be compensated by forming at least one of the surfaces S5, S6, S7, and S8 of the third lens 103 and the fourth lens 104 as an aspheric surface.

According to an embodiment, the image side (I)-facing surface S12 of the fifth lens 106 may be convex, and the object side (O)-facing surface S9 of the sixth lens 105 may be concave. The fifth lens 106 and the sixth lens 105 may be used to distribute adequate refractive powers per height for the light which has passed through the fourth lens 104. Since aspheric surfaces works better for the fifth lens 106 and the sixth lens 105, different refractive powers may be given depending on the height from the optical axis. This allows the light transmitted through the marginal portion of the lens to be imaged well on the imaging plane 108a. According to an embodiment, the fifth lens 106 may have a positive refractive power, and the sixth lens 105 may have a negative refractive power. Thus, chromatic aberration and curvature of field may be corrected.

According to an embodiment, the object side (O)-facing surface S11 of the fifth lens 106 may be flat or concave, and the image side (I)-facing surface S10 of the sixth lens 105 may be convex or flat. According to an embodiment, the object side (O)-facing surface S11 of the fifth lens 106 may be concave, and the image side (I)-facing surface S12 of the fifth lens 106 may be convex. The object side (O)-facing surface S9 of the sixth lens 105 may be concave, and the image side (I)-facing surface S10 of the sixth lens 105 may be concave.

According to an embodiment, at least one of the object side (O)-facing surface S9 or the image side (I)-facing surface S10 of the sixth lens 105 may be an aspheric surface. This may prevent distortion that may arise when light passes through the marginal portion of the lens. According to an embodiment, the object side (O)-facing surface S11 or image side (I)-facing surface S12 of the fifth lens 106 may also be an aspheric surface. This enables compensation for spherical aberration.

According to an embodiment, in the plurality of lenses (e.g., 101, 102, 103, 104, 105, and 106) of the lens assembly 100, as the interval between two neighboring lenses reduces, the whole length (the overall length of the lens assembly along the optical axis) of the lens assembly 100 may shorten. For example, upon attempting to make a more compact optical device and/or electronic device including the lens assembly 100 according to an embodiment, it would be more advantageous to keep the whole length of the lens assembly 100 as short as possible. However, if an adequate telephoto ratio is needed, reducing the whole length of the lens assembly 100 may be physically limited. According to an embodiment, the intervals between the plurality of lenses (e.g., 101, 102, 103, 104, 105, and 106) may be varied depending on the optical properties (e.g., aberration, wide angle, and/or brightness properties) required for the lens assembly 100.

According to an embodiment, the radius of curvature, thickness, TTL (whole length of the lens assembly), and focal length of a lens as described herein may be in millimeters unless stated otherwise. The thickness of a lens, the interval between lenses, or TTL (or OAL (optical total length)) may be distances measured from at the center of the lens assembly, i.e. along the optical axis. In describing the shape of a lens, "one surface of the lens is convex" may mean that the chief portion of the surface is convex, and "one surface of the lens is concave" may mean that the chief portion of the surface is concave. Thus, although one surface of a lens (e.g., the chief portion of the surface) is described as convex in shape, edge or marginal portions of the lens may be concave. Likewise, although one surface of a lens (e.g., the chief portion of the surface) is described as concave in shape, edge or marginal portions of the lens may be convex. As used herein, the term "inflection point" means a point where the radius of curvature changes from + to − or from − to + at a portion of the lens that does not cross the optical axis. According to an embodiment, the lens assembly 100 may include at least one aperture.

Figure 13:
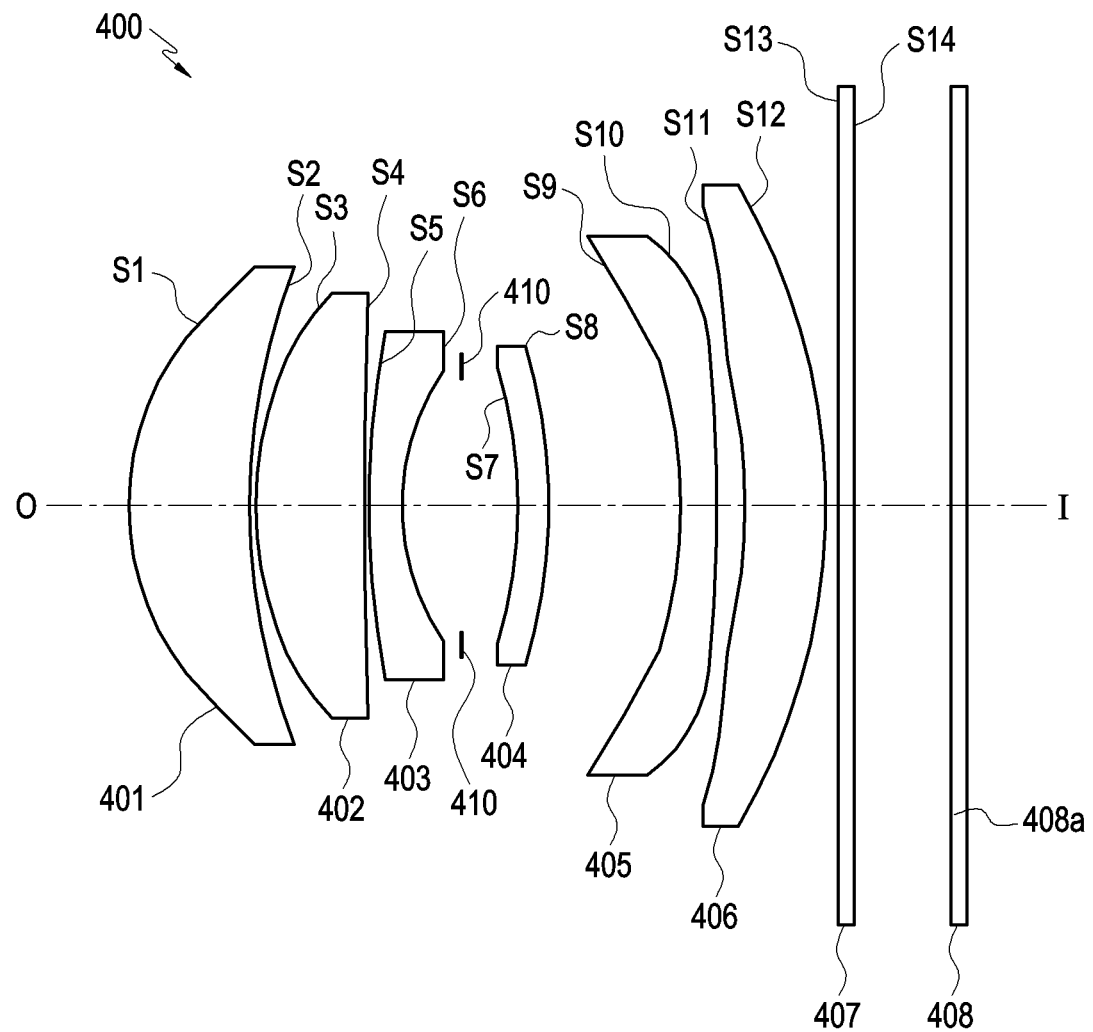
FIG. 13 is a view illustrating a configuration of a lens assembly according to an embodiment.

As the size of the aperture is adjusted, the amount of light reaching the imaging plane 108a of the image sensor 108 may be adjusted. The aperture may be in various positions. For example, as shown in FIG. 13 described below, an aperture (e.g., 410 of FIG. 13 described below) may be placed between the image side (I)-facing surface S6 of the third lens and the object side (O)-facing surface S7 of the fourth lens. According to an embodiment, there may be provided a plurality of apertures.

According to an embodiment, the lens assembly 100 may further include a filter 107 between the fifth lens 106 and the image sensor 108. The filter 107 may block off light, e.g., infrared (IR) light, to prevent the light from reaching the image sensor or a film of the optical device. The filter 107 may include at least one of, e.g., a low pass filter or a cover glass. For example, the filter 107 may allow the color of the image detected and captured by the image sensor 108 to be closer to the actual color seen by a human. The filter 107 may transmit visible light but reflect IR light so that IR light does not reach the imaging plane 108a of the image sensor.

According to an embodiment, at least one of the fifth lens 106 or the sixth lens 105 may include at least one surface with an inflection point. The inflection point may denote a point where the sign of the radius of curvature changes from + to − or from − to +. That is, the inflection point may denote a point where the shape of the lens changes from convex to concave or from concave to convex. The radius of curvature may denote a value or degree of curvature at each point on a curve or curved surface.

According to an embodiment, as the object side (O)-facing surface S1 of the first lens 101 is convex, spherical aberration may be suppressed from increasing due to the large aperture. This may also bring about the effect of reducing the whole length of the lens assembly or electronic device.

According to an embodiment, the second lens 102 may have a strong positive refractive power. As the object side (O)-facing surface S3 of the second lens 102 is convex, spherical aberration caused by large aperture may be corrected effectively. According to an embodiment, the object side (O)-facing surface S3 and image side (I)-facing surface S4 of the second lens 102 may properly distribute the refractive power, thereby reducing deterioration of performance due to manufacturing errors.

According to an embodiment, as the third lens 103 has a negative refractive power and the object side (O)-facing surface S5 of the third lens 103 is convex, coma aberration and curvature of field, which may be caused by the second lens 102, may effectively be corrected. The chromatic aberration which may occur in the first lens 101 and the second lens 102 may be effectively corrected by including a high-dispersive material in the third lens 103.

According to an embodiment, as the fourth lens 104 includes one or more aspheric surfaces, coma may be prevented from occurring in the marginal portion (e.g., the portion a predetermined distance from the optical axis) of the image sensor 108. The fourth lens 104 may have a positive refractive power or a negative refractive power. According to an embodiment, depending on the distribution of refractive powers of the first, second, and third lenses 101, 102, and 103, the fourth lens 104 may have no refractive power.

As the object side (O)-facing surface S11 of the fifth lens 106 or the image side (I)-facing surface S12 of the fifth lens 106 includes at least one inflection point, such that the curvature of field which may occur from the center of the imaging plane 108a of the image sensor to the marginal portion may be reduced.

As the object side (O)-facing surface S9 of the sixth lens 105 is formed to be concave, light incident to the imaging plane 108a of the image sensor is allowed to have a small slope, so that a necessary amount of light may be secured for the marginal portion of the image sensor 108. By so doing, the lens assembly 100 including a plurality of large-aperture lenses (e.g., 101, 102, 103, 104, 105, and 106) that allows a bright object image to be obtained on the imaging plane 108a of the image sensor even in a low illuminance environment. The above-described lens assembly 100 has a view angle of about 80 degrees and meets Equation 1 below and is thus made compact while presenting good optical properties.

$$8 < \frac{TTL}{\text{Tan}\theta} < 25 \quad \text{[Equation 1]}$$

Here, TTL may mean the whole length (e.g., the distance from the object side (O)-facing surface S1 of the first lens to the imaging plane 108a) of the lens assembly 100, and θ may mean the half-view angle of the lens assembly 100. As Equation 1 above is met, the telephoto view angle may be achieved, and the lens assembly may be miniaturized. For example, if the ratio of the whole length of the lens assembly 100 to the tangent of the half-view angle of the lens assembly 100 exceeds the upper limit, i.e., 25, the lens assembly cannot be made compact. Alternatively, if the ratio is lower than the lower limit, i.e., 8, the view angle of the telephoto lens may not be obtained or the whole length of the lens assembly may exceed design parameters.

The lens assembly 100 may meet Equation 2 below.

$$0.3 < \frac{\text{Sag\_13}}{Y} < 0.8 \quad \text{[Equation 2]}$$

Here, Sag_13 may mean the sum of the effective distance Sag_1 on the sagittal plane of the first lens 101 and the effective distance Sag_2 on the sagittal plane of the second lens 102, and Y may mean the half of the diagonal length of the image sensor 108. As the sum Sag_13 of the effective distances Sag_1 and Sag_2 on the sagittal plane of the first lens 101 and the sagittal plane of the second lens 102 are adjusted for the parameter Y for the length of the image sensor 108, the coma aberration of the marginal portion of the image sensor due to the large-aperture lenses may be corrected properly. According to an embodiment, if the ratio of the effective distance Sag_13 to the diagonal length of the image sensor exceeds the lower limit, i.e., 0.3, the large-aperture lenses are allowed to maintain predetermined proportions of positive refractive power. And if the ratio of the effective distance Sag_13 to the diagonal length of the image sensor 108 is less than the upper limit, i.e., 0.8, the negative refractive power may be prevented from increasing so that the coma aberration may be corrected properly. However, if the ratio exceeds the upper limit, the coma aberration may be hard to correct or the processability of the lenses may be worsened. Below the lower limit, the refractive power may be excessively reduced, and the whole length may be lengthened.

The lens assembly may also meet Equation 3 below.

$$0.2 < \frac{ET1 + ET2}{CT1 + CT2} < 0.45 \quad \text{[Equation 3]}$$

Here, ET1 may be the thickness of one end of the marginal portion of the first lens, as shown in FIG. 1A for example, and ET2 may be the thickness of one end of the marginal portion of the second lens. CT1 may be the thickness of the chief portion of the first lens, and CT2 may be the thickness of the chief portion of the second lens. If the sum of the thicknesses of the marginal portions of the first lens and the second lens is smaller than the sum of the thicknesses of the chief portions of the first lens and the second lens such that the ratio exceeds 0.2, an effective positive refractive power may be secured. The ratio may be less than 0.45. If the ratio of the sum of the thicknesses of the marginal portions of the first lens and the second lens to the sum of the thicknesses of the chief portions of the first lens and the second lens is less than 0.2, the processability may be extremely deteriorated. If the ratio of the sum of the thicknesses of the marginal portions of the first lens and the second lens to the sum of the thicknesses of the chief portions of the first lens and the second lens is more than 0.45, the positive refractive power may be weakened so that the need to extend the optical whole length may be required.

The shape of lenses (e.g., the first lens and the second lens) with positive refractive powers may be defined by Equations 1 to 3 above.

The lens assembly 100 may meet Equation 4 below.

$$0.23 < \frac{D_{S1}}{TTL} < 0.8 \quad \text{[Equation 4]}$$

Here, $D_{S1}$ may mean the effective diameter of the first lens 101, and TTL may mean the whole length of the lens assembly 100. If the ratio of the effective diameter of the first lens 101 to the whole length of the lens assembly 100 exceeds 0.23, a large aperture may be implemented, and if the ratio is less than 0.8, the whole length may be prevented from excessively increasing.

The lens assembly 100 may meet Equation 5 below.

$$-1.5 < \frac{f_{air}}{efl} < -0.2 \quad \text{[Equation 5]}$$

Here, $f_{air}$ may denote the composite focal length of the third lens 103 and the fourth lens 104, and efl may denote the composite focal length of the lens assembly 100. If the above equation exceeds the upper limit, −0.2, a desired negative refractive power may not be obtained, and sufficient correction of the spherical aberration may be rendered difficult. In contrast, below the lower limit, −1.5, correction of the spherical aberration may be easy, but the back focal length may lengthen so that the coma flare in the marginal portion of the image forming on the imaging plane 108a may enlarge, thus making it impossible to achieve a sufficient optical performance for the marginal portion.

The lens assembly 100 may also meet Equations 6 to 9 below.

$45 < Vd\_p < 80$      [Equation 6]

$15 < Vd\_n < 30$      [Equation 7]

$15 < Vd\_pL < 30$      [Equation 8]

$40 < Vd\_nL < 65$      [Equation 9]

Here, Vd_p may mean the mean of the Abbe numbers of the first lens 101 and the second lens 102. Vd_n may mean the mean of the Abbe numbers of the third lens 103 and the fourth lens 104. Vd_pL may mean the Abbe number of the fifth lens 106. Vd_nL may mean the Abbe number of the sixth lens 105. According to an embodiment, the mean of the Abbe numbers of the first lens 101 and the second lens 102 and the mean of the Abbe numbers of the third lens 103 and the fourth lens 104 may be set to have a difference of about 15 or more therebetween. The Abbe number of the fifth lens 106 and the sixth lens 105 may be set to have a difference of about 10 or more therebetween. As set forth above, chromatic aberration, in particular, longitudinal chromatic aberration, of the lens assembly may be prevented from increasing by adjusting the Abbe numbers of the first lens 101, the second lens 102, the third lens 103, the fourth lens 104, the fifth lens 106, and the sixth lens 105, thereby achieving an adequate level of image quality. Table 1 below show various data about the lens assembly 100, wherein "S1 to S14" may denote the surfaces of a plurality of relevant lenses (e.g., 101, 102, 103, 104, 105, and 106), and/or the filter 107. "Radius" may mean the radius of curvature of the lens, "Thick" may mean the thickness of the lens or the air interval, "H-Ape" may mean the radius of the lens, "EFL" may mean the focal length of the lens, "nd" may mean the refractive index of the medium (e.g., the lens), and "vd" may mean the Abbe number of the lens. The lens assembly 100 of Table 1 below may have an F-number (F-No) of about 1.773, a view angle (ANG) of about 46 degrees, and a composite focal length of about 5.85 mm and may meet at least one or more of the above-described conditions.

TABLE 1

| Surf obj | Radius infinity | Thick infinity | H-Ape | EFL | Nd | vd |
|---|---|---|---|---|---|---|
| S1* | 1.797 | 0.839 | 1.65 | 4.688 | 1.5441 | 56.09 |
| S2* | 5.026 | 0.043 | 1.575 | | | |
| S3* | 2.865 | 0.757 | 1.484 | 6.063 | 1.5311 | 55.91 |
| S4* | 22.812 | 0.18 | 1.353 | | | |
| S5* | −12.358 | 0.296 | 1.15 | −3.575 | 1.66074 | 20.37 |
| S6* | 2.99 | 0.472 | 0.853 | | | |
| S7* | −4.259 | 0.273 | 0.875 | 76.4 | 1.67074 | 19.23 |
| S8* | −4.037 | 0.608 | 1.072 | | | |
| S9* | 28.977 | 0.26 | 1.73 | −6.023 | 1.5441 | 56.09 |
| S10* | 2.946 | 0.225 | 1.908 | | | |
| S11* | −20.163 | 0.845 | 2.151 | 12.101 | 1.65038 | 21.52 |
| S12* | −5.799 | 0.03 | 2.264 | | | |
| S13 | infinity | 0.11 | 2.9 | infinity | 1.5168 | 64.2 |
| S14 img | infinity infinity | 0.664 | 2.9 | | | |

Tables 2 and 3 below show the aspheric coefficients of the plurality of lenses (e.g., 101, 102, 103, 104, 105, and 106), which may be calculated by Equation 10 as follows:

$$x = \frac{cy^2}{1 + \sqrt{1 - (K+1)c^2 y^2}} + Ay^4 + By^6 + Cy^8 + Dy^{10} + \ldots \quad [\text{Equation 10}]$$

Here, "x" may mean the distance from the vertex of the lens to the optical axis O-I, "c" the default curvature of the lens, "y" the distance in the direction perpendicular to the optical axis, "K" the Conic constant, and "A," "B," "C," "D," "E," and "F" the aspheric coefficients.

TABLE 2

| Surf | K (Conic) | A (4th) | B (6th) | C (8th) | D (10th) |
|---|---|---|---|---|---|
| S1 | −3.28E−01 | 1.26E−03 | 2.05E−03 | −2.71E−03 | 1.55E−03 |
| S2 | 1.65E+00 | 1.83E−02 | −5.77E−03 | 3.27E−04 | 8.44E−07 |
| S3 | −1.64E−01 | 2.12E−02 | 2.67E−03 | −6.65E−03 | 3.29E−03 |
| S4 | −1.00E+00 | −1.55E−02 | 1.20E−02 | −7.15E−03 | 3.93E−03 |
| S5 | −1.00E+00 | 7.09E−02 | −1.67E−02 | 8.07E−03 | −1.44E−03 |
| S6 | 0.00E+00 | 1.24E−01 | 3.33E−02 | −1.79E−01 | 6.74E−01 |
| S7 | 0.00E+00 | −9.16E−02 | −7.22E−02 | 2.64E−01 | −5.52E−01 |
| S8 | 0.00E+00 | −6.38E−02 | 6.29E−02 | −8.89E−02 | 1.67E−01 |
| S9 | 0.00E+00 | −1.94E−01 | 6.96E−02 | 9.45E−03 | −9.46E−03 |
| S10 | 0.00E+00 | −1.73E−01 | 7.10E−02 | −2.36E−02 | 4.28E−03 |
| S11 | 0.00E+00 | −4.69E−03 | −3.92E−04 | −3.36E−04 | 4.38E−04 |
| S12 | −1.38E+00 | −4.71E−02 | 1.33E−02 | −2.30E−03 | 3.01E−04 |

TABLE 3

| Surf | K (Conic) | E (12th) | F (14th) | G (16th) | H (18th) |
|---|---|---|---|---|---|
| S1 | −3.28E−01 | −3.91E−04 | −2.15E−05 | 0.00E+00 | 0.00E+00 |
| S2 | 1.65E+00 | 1.02E−04 | −6.10E−05 | 0.00E+00 | 0.00E+00 |
| S3 | −1.64E−01 | 2.55E−04 | −2.16E−04 | 0.00E+00 | 0.00E+00 |
| S4 | −1.00E+00 | −1.85E−03 | 4.21E−04 | 0.00E+00 | 0.00E+00 |
| S5 | −1.00E+00 | −2.31E−03 | 2.66E−03 | 0.00E+00 | 0.00E+00 |
| S6 | 0.00E+00 | −9.73E−01 | 5.72E−01 | 0.00E+00 | 0.00E+00 |
| S7 | 0.00E+00 | 6.33E−01 | −3.73E−01 | 0.00E+00 | 0.00E+00 |
| S8 | 0.00E+00 | −1.37E−01 | 3.42E−02 | 0.00E+00 | 0.00E+00 |
| S9 | 0.00E+00 | 1.62E−03 | −1.57E−05 | −1.19E−05 | −1.48E−07 |
| S10 | 0.00E+00 | −2.38E−04 | −3.22E−05 | 4.10E−06 | −1.07E−07 |
| S11 | 0.00E+00 | −1.07E−04 | 8.36E−06 | 3.97E−07 | −9.29E−08 |
| S12 | −1.38E+00 | −1.78E−05 | −5.43E−06 | 2.07E−06 | −2.03E−07 |

Figure 2:
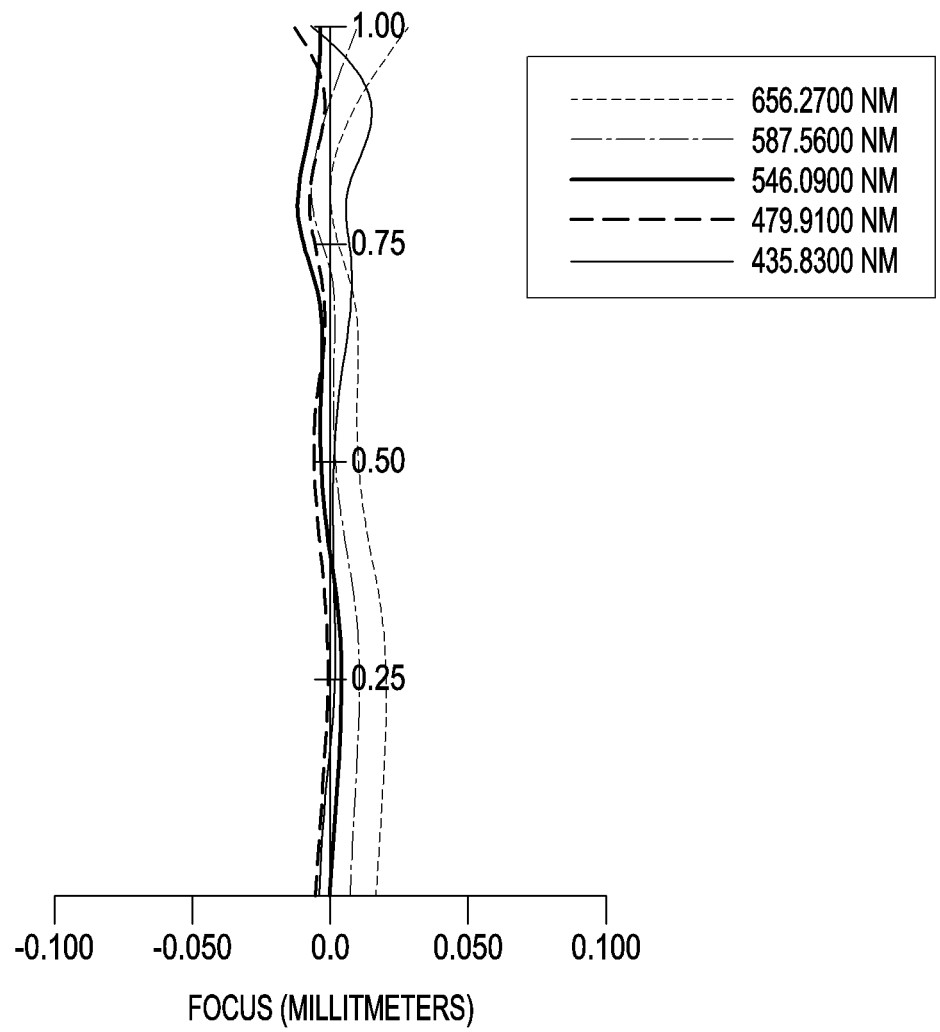
FIG. 2 is a graph illustrating the spherical aberration of a lens assembly according to the embodiment of FIG. 1B.

FIG. 2 is a graph illustrating the spherical aberration of the lens assembly 100 according to an embodiment (e.g., the embodiment of FIG. 1B). Spherical aberration may refer to the phenomenon where light beams passing through different portions (e.g., the chief portion and the marginal portion) of the lens are focused on different positions.

In FIG. 2, the horizontal axis refers to the degree of longitudinal spherical aberration, and the vertical axis refers to the result of normalization of the distance from the optical axis. FIG. 2 may illustrate variations in longitudinal spherical aberration depending on light wavelengths. The longitudinal spherical aberration are shown for about 656.2700 nanometers (nm), about 587.5600 nm, about 546.0900 nm, about 479.9100 nm, and about 435.8300 nm. Referring to FIG. 2, in a visible light range, the longitudinal spherical aberration of the lens assembly, according to an embodiment, may be limited to be within a range from +0.050 to −0.050 so that stable optical properties are shown.

Figure 3:
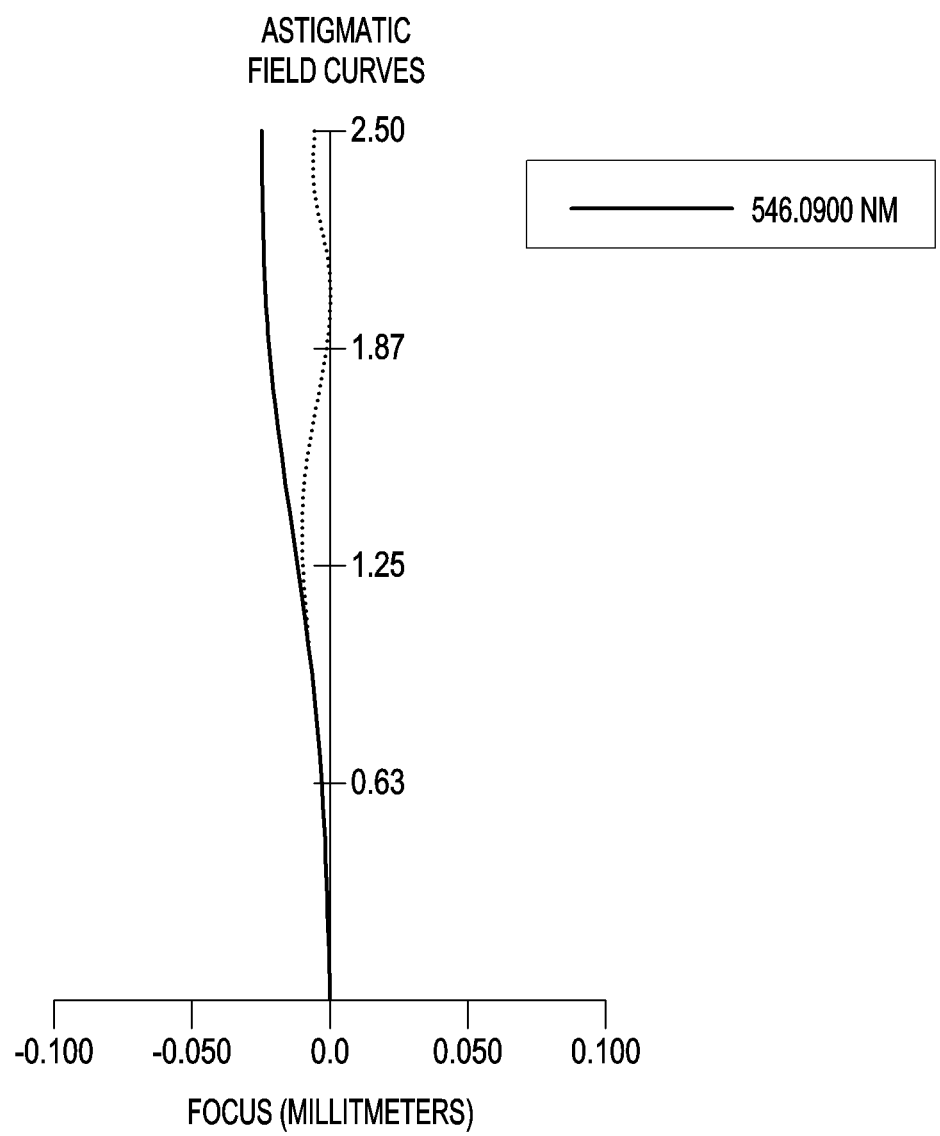
FIG. 3 is a graph illustrating the astigmatism of a lens assembly according to the embodiment of FIG. 1B.

FIG. 3 is a graph illustrating the astigmatism of the lens assembly 100 according to an embodiment (e.g., the embodiment of FIG. 1B). Astigmatism may refer to a deviation between the focuses of the light beams passing in the vertical and horizontal directions when the tangential plane or meridian plane of the lens has a different radius from the radius of the sagittal plane of the lens.

FIG. 3 shows the results of astigmatism of the lens assembly 100 when light beams are obtained in a wavelength of about 546.0900 nm, wherein the solid line may denote the astigmatism in the tangential direction (e.g., tangential field curvature), and a dotted-line may denote the astigmatism in the sagittal direction (e.g., sagittal field curvature). It can be identified from FIG. 3 that the astigmatism may be limited to a range from +0.050 to −0.050 so that stable optical properties may be shown according to an embodiment.

Figure 4:
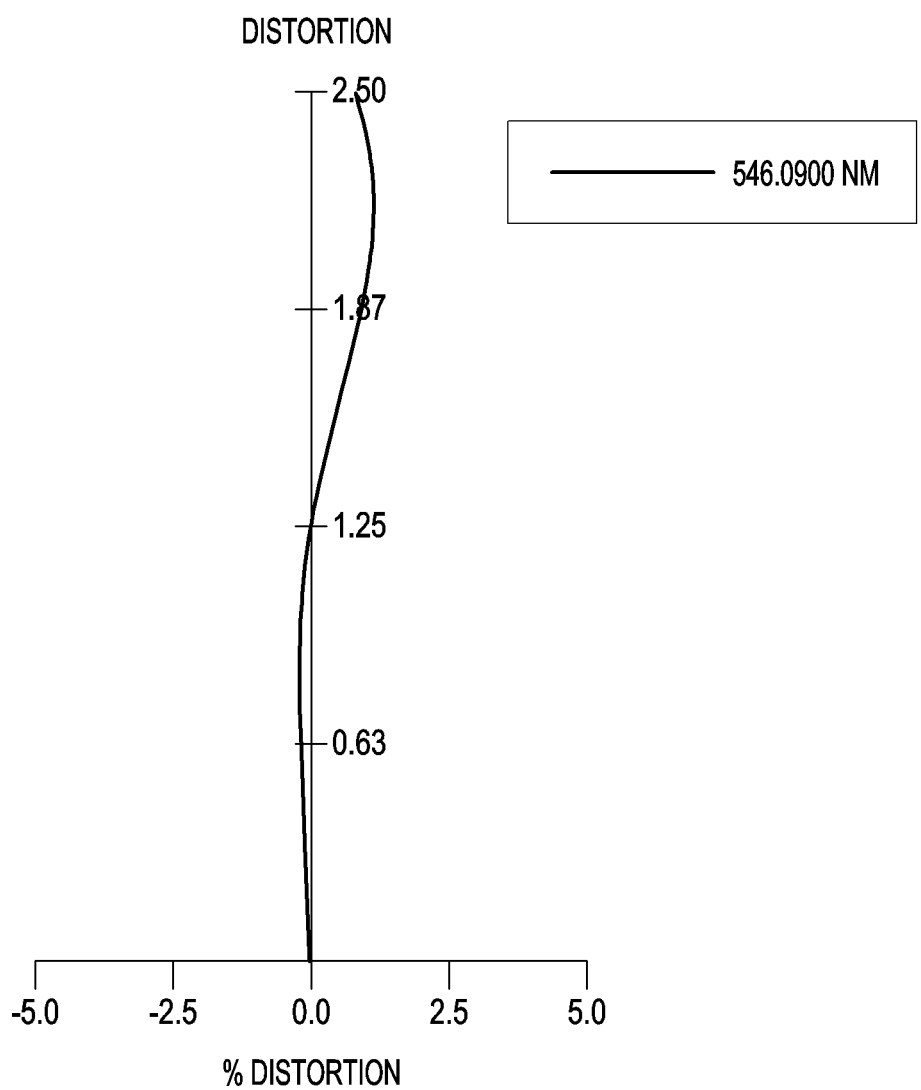
FIG. 4 is a graph illustrating the distortion of a lens assembly according to the embodiment of FIG. 1B.

FIG. 4 is a graph illustrating the distortion of the lens assembly 100 according to an embodiment (e.g., the embodiment of FIG. 1B). Distortion occurs because the optical magnification varies depending on the distance from the optical axis O-I. As compared with an image forming on a theoretical imaging plane, an image forming on the actual imaging plane (e.g., 108a of FIG. 1) may be shown to be larger or smaller by distortion.

FIG. 4 shows the results of distortion of the lens assembly 100, which are obtained in a wavelength of about 546.0900 nm. The image captured by the lens assembly 100 may cause a slight degree of distortion at a point off the optical axis O-I. However, such a degree of distortion may normally arise in optical devices with lenses, and the rate of distortion in the instant lens assembly is shown as being less than about 3%, which is a relatively good optical property.

Figure 5:
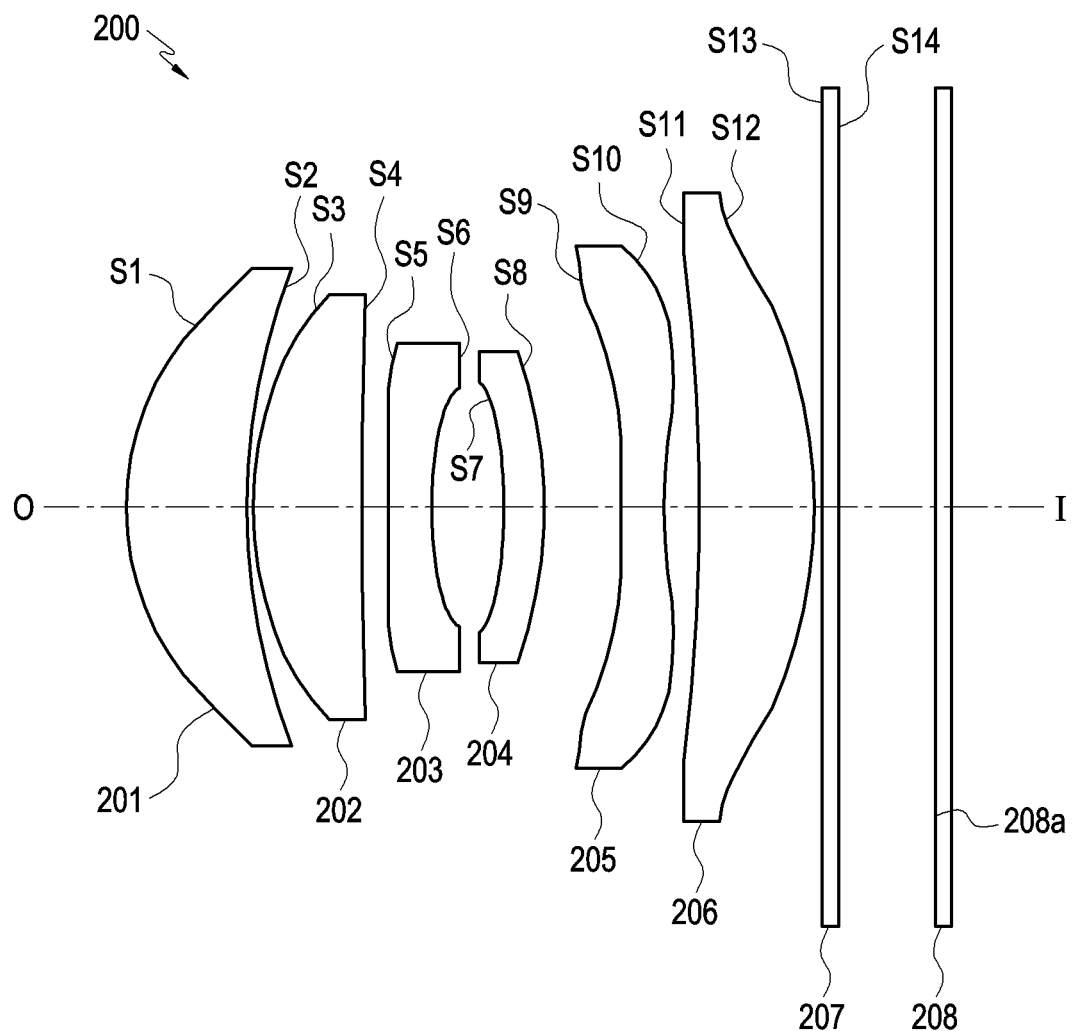
FIG. 5 is a view illustrating a configuration of a lens assembly according to an embodiment.
Figure 6:
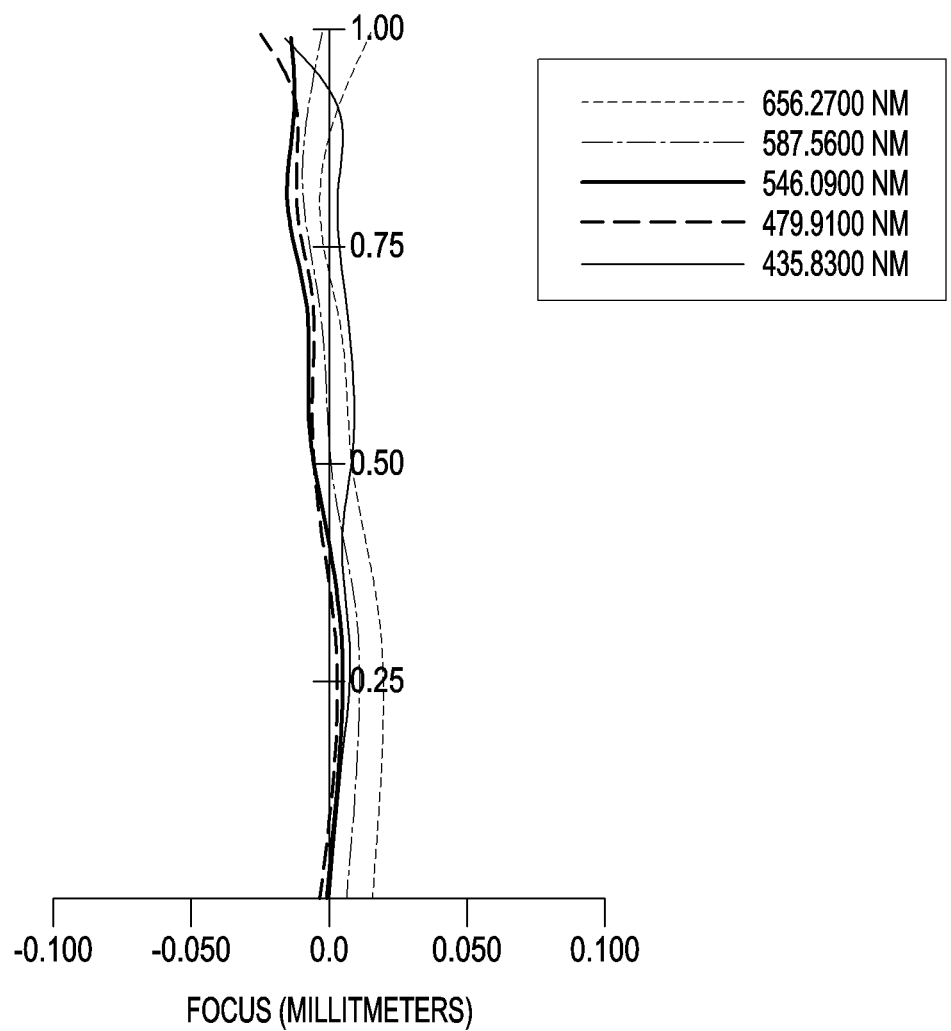
FIG. 6 is a graph illustrating the spherical aberration of a lens assembly according to the embodiment of FIG. 5.
Figure 7:
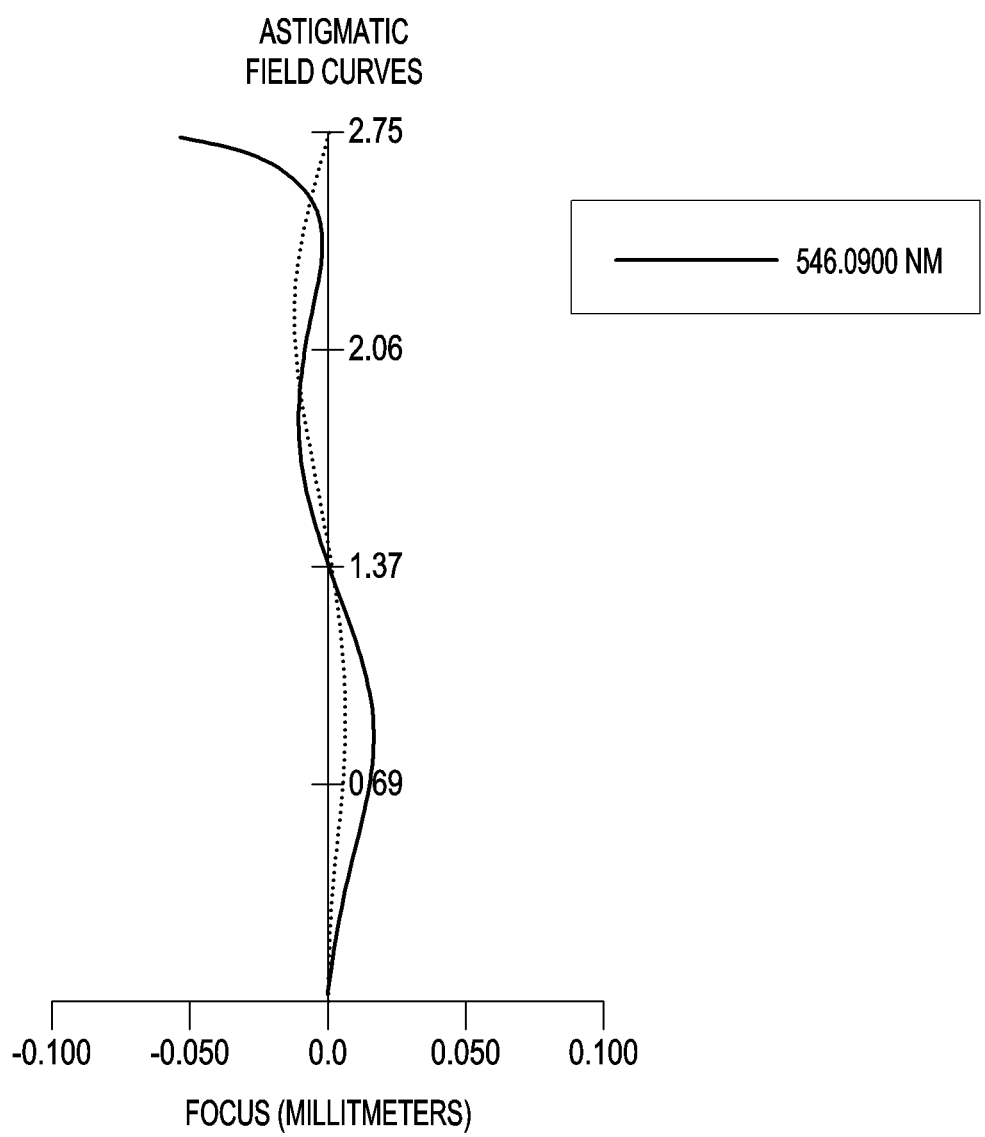
FIG. 7 is a graph illustrating the astigmatism of a lens assembly according to the embodiment of FIG. 5.
Figure 8:
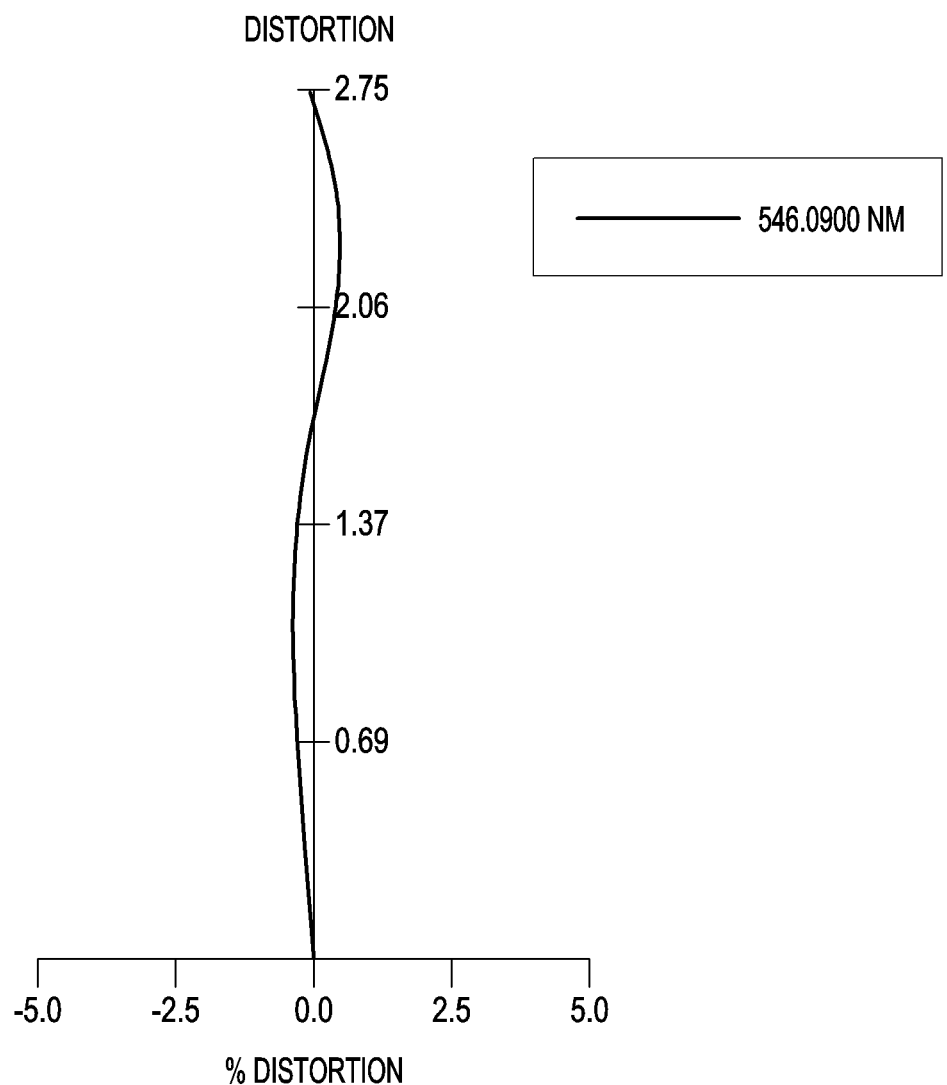
FIG. 8 is a graph illustrating the distortion of a lens assembly according to the embodiment of FIG. 5.

FIG. 5 is a view illustrating a configuration of a lens assembly 200 according to an embodiment. FIG. 6 is a graph illustrating the spherical aberration of a lens assembly 200 according to the embodiment of FIG. 5. FIG. 7 is a graph illustrating the astigmatism of a lens assembly 200 according to the embodiment of FIG. 5. FIG. 8 is a graph illustrating the distortion of a lens assembly 200 according to the embodiment of FIG. 5.

The description of the lens assembly 100 according to the foregoing embodiments may apply to lens assemblies 200, 300, 400, and 500 described below according to other various embodiments. Some of the plurality of lens assemblies 100, 200, 300, 400, and 500 may have the same lens attribute (e.g., view angle, focal length, auto-focusing, f number, or optical zoom), however at least one lens assembly may have one or more lens attributes different from those of other lens assemblies.

The plurality of lens assemblies 100, 200, 300, 400, and 500 may include flash (2220 of FIG. 22 as described below), image sensors 108, 208, 308, 408, and 508, image stabilizers (2240 of FIG. 22 as described below), memories (2250 of FIG. 22 as described below), or image signal processors (2260 of FIG. 22 as described below), thereby constituting optical devices (e.g., camera modules).

In describing the following embodiments, the same or similar, or no reference characters are given for components which may readily be appreciated from the above-described embodiments. No detailed description thereof is presented below as long as it overlaps the above description.

Referring to FIGS. 5 to 8, according to an embodiment different from the embodiment of FIG. 1, a lens assembly 200 may include a plurality of lenses (e.g., 201, 202, 203, 204, 205, and 206), an image sensor 208, and/or a filter 207.

Table 4 below may represent various lens data about the lens assembly 200 according to the embodiment of FIG. 5. Tables 5 and 6 below may show the aspheric coefficients of the plurality of lenses (e.g., 201, 202, 203, 204, 205, and 206). The lens assembly 200 may have an F-number (F-No) of about 1.9772, a view angle (ANG) of about 49.4 degrees, and a focal length of about 5.996 mm and may meet at least one or more of the above-described conditions.

TABLE 4

| Surf obj | Radius infinity | Thick infinity | H-Ape | EFL | nd | vd |
|---|---|---|---|---|---|---|
| S1* | 1.776 | 0.717 | 1.52 | 3.937 | 1.5441 | 55.94 |
| S2* | 8.714 | 0.1 | 1.446 | | | |
| S3* | 4.548 | 0.68 | 1.384 | 8.224 | 1.5348 | 55.74 |
| S4* | −145.305 | 0.273 | 1.269 | | | |
| S5* | −9.77 | 0.27 | 1.025 | −3.405 | 1.66074 | 20.37 |
| S6* | 2.999 | 0.374 | 0.803 | | | |
| S7* | −8.531 | 0.257 | 0.828 | 329.034 | 1.67074 | 19.23 |
| S8* | −8.317 | 0.74 | 1.004 | | | |
| S9* | 37.11 | 0.3 | 1.64 | −5.752 | 1.5348 | 55.74 |
| S10* | 2.844 | 0.259 | 1.85 | | | |
| S11* | −64.182 | 0.8 | 2.133 | 9.825 | 1.67074 | 19.23 |
| S12* | −6.073 | 0.1 | 2.227 | | | |
| S13 | infinity | 0.11 | 2.487 | infinity | 1.5168 | 64.2 |
| S14 | infinity | 0.625 | 2.513 | | | |
| img | infinity | | | | | |

TABLE 5

| Surf | K (Conic) | A (4th) | B (6th) | C (8th) | D (10th) |
|---|---|---|---|---|---|
| S1 | −3.17E−03 | −8.04E−03 | 8.05E−04 | −3.54E−03 | 1.08E−03 |
| S2 | 2.79E+01 | 4.18E−02 | −9.62E−03 | 1.64E−03 | −6.52E−04 |
| S3 | 6.25E+00 | 4.91E−02 | −4.60E−03 | −3.55E−03 | 4.12E−03 |
| S4 | −1.00E+00 | −5.71E−03 | 1.16E−02 | −6.92E−03 | 1.38E−03 |
| S5 | −1.00E+00 | 4.64E−02 | 5.51E−02 | −5.84E−02 | 2.84E−02 |
| S6 | 0.00E+00 | 5.06E−02 | 1.16E−01 | −6.65E−02 | −3.18E−02 |
| S7 | 0.00E+00 | −1.51E−01 | 4.00E−02 | −9.37E−02 | 1.88E−01 |
| S8 | 0.00E+00 | −7.38E−02 | 5.25E−02 | 9.89E−03 | −7.50E−03 |

TABLE 5-continued

| Surf | K (Conic) | A (4th) | B (6th) | C (8th) | D (10th) |
|---|---|---|---|---|---|
| S9 | 0.00E+00 | −1.66E−01 | 7.26E−02 | −1.52E−02 | 4.72E−03 |
| S10 | 0.00E+00 | −1.60E−01 | 6.70E−02 | −2.34E−02 | 3.34E−03 |
| S11 | 0.00E+00 | −1.73E−02 | 2.66E−03 | 1.03E−04 | −6.38E−05 |
| S12 | −1.00E+00 | −4.83E−02 | 1.19E−02 | −2.63E−03 | 3.84E−04 |

TABLE 6

| Surf | K (Conic) | E (12th) | F (14th) | G (16th) | H (18th) |
|---|---|---|---|---|---|
| S1 | −3.17E−03 | −2.51E−04 | −1.03E−04 | 0.00E+00 | 0.00E+00 |
| S2 | 2.79E+01 | −1.10E−06 | −6.37E−05 | 0.00E+00 | 0.00E+00 |
| S3 | 6.25E+00 | −1.11E−03 | 0.00E+00 | 0.00E+00 | 0.00E+00 |
| S4 | −1.00E+00 | 0.00E+00 | 0.00E+00 | 0.00E+00 | 0.00E+00 |
| S5 | −1.00E+00 | 3.60E−04 | 0.00E+00 | 0.00E+00 | 0.00E+00 |
| S6 | 0.00E+00 | 1.28E−01 | 0.00E+00 | 0.00E+00 | 0.00E+00 |
| S7 | 0.00E+00 | −2.21E−01 | 0.00E+00 | 0.00E+00 | 0.00E+00 |
| S8 | 0.00E+00 | −5.95E−03 | 0.00E+00 | 0.00E+00 | 0.00E+00 |
| S9 | 0.00E+00 | −2.83E−03 | 1.00E−03 | −1.30E−04 | 0.00E+00 |
| S10 | 0.00E+00 | 5.20E−04 | −3.31E−04 | 4.46E−05 | 0.00E+00 |
| S11 | 0.00E+00 | −5.81E−06 | 1.49E−05 | −2.40E−06 | 0.00E+00 |
| S12 | −1.00E+00 | 3.92E−05 | −6.45E−06 | −5.09E−07 | 0.00E+00 |

Figure 9:
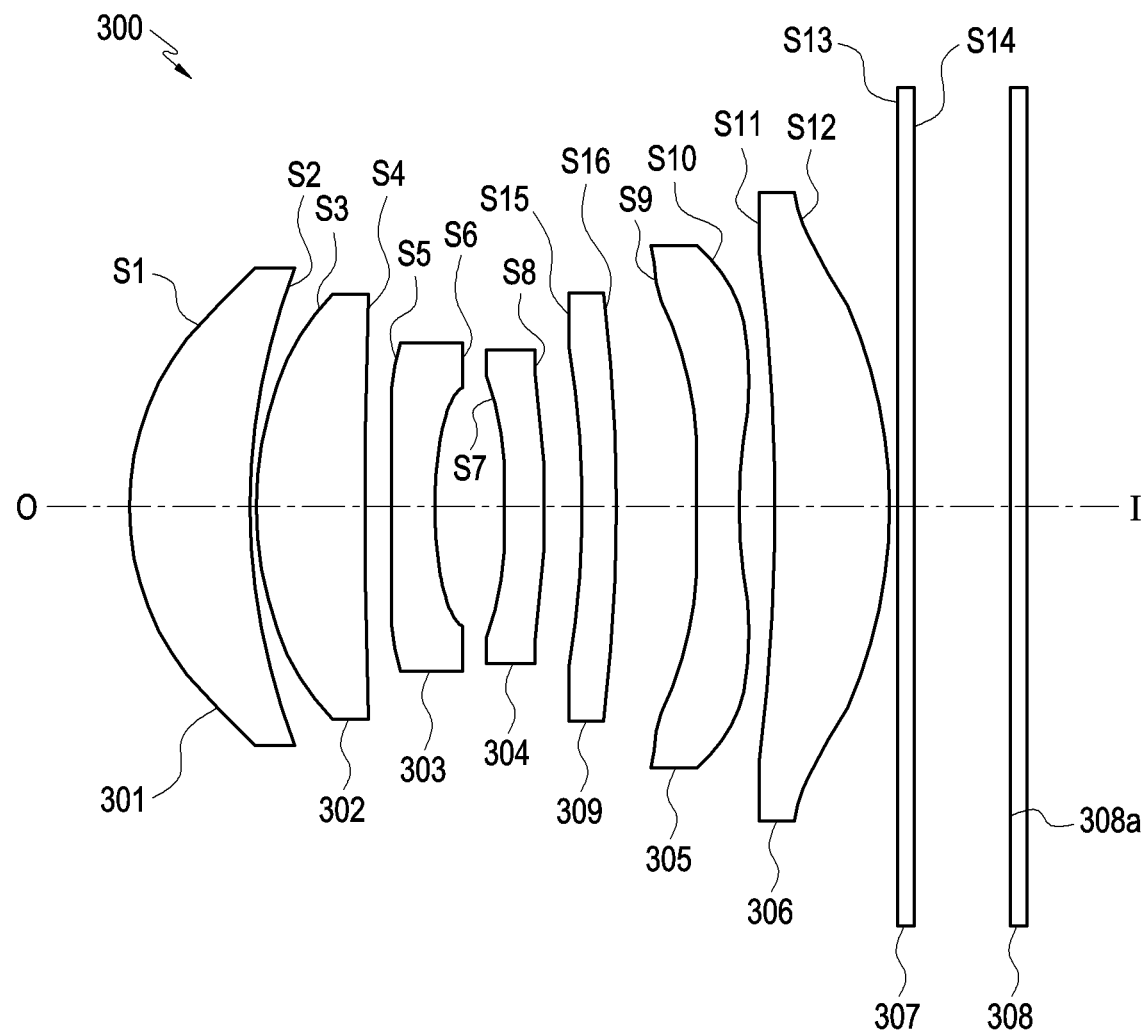
FIG. 9 is a view illustrating a configuration of a lens assembly according to an embodiment.
Figure 10:
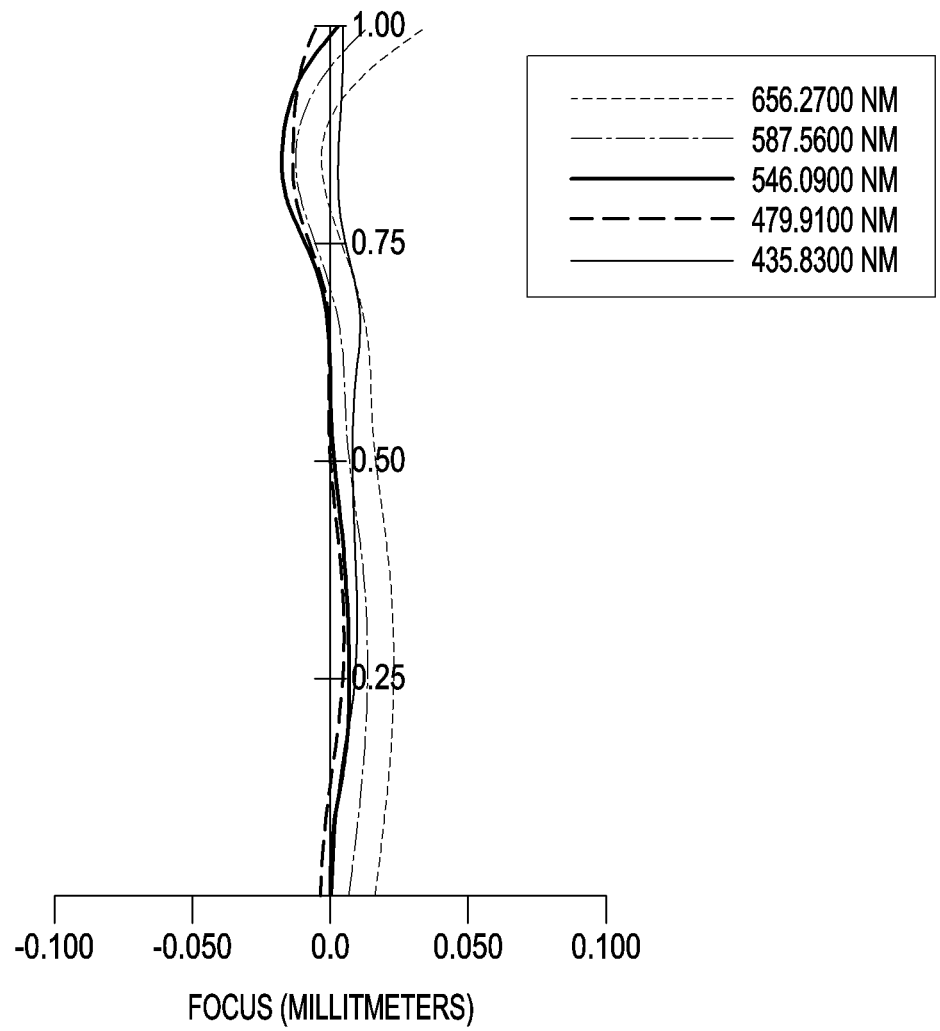
FIG. 10 is a graph illustrating the spherical aberration of a lens assembly according to the embodiment of FIG. 9.
Figure 11:
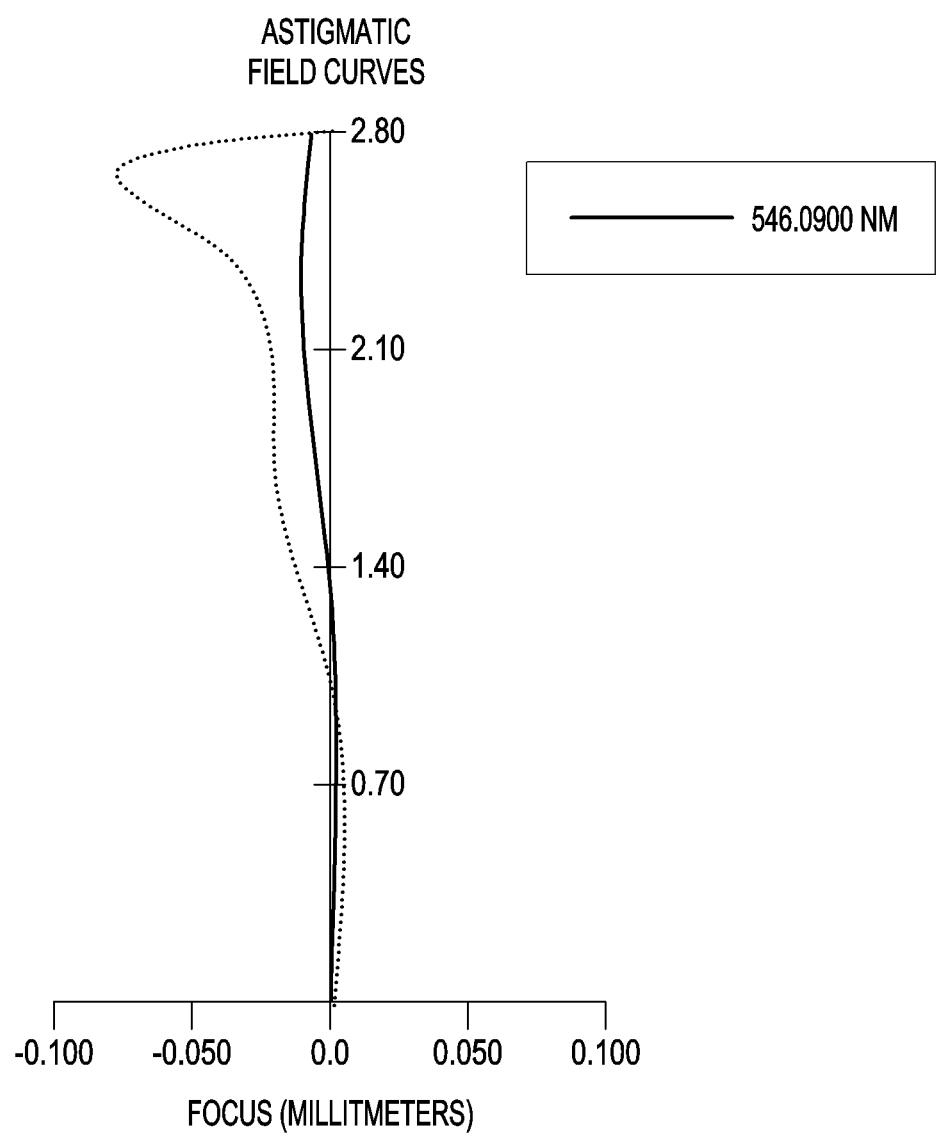
FIG. 11 is a graph illustrating the astigmatism of a lens assembly according to the embodiment of FIG. 9.
Figure 12:
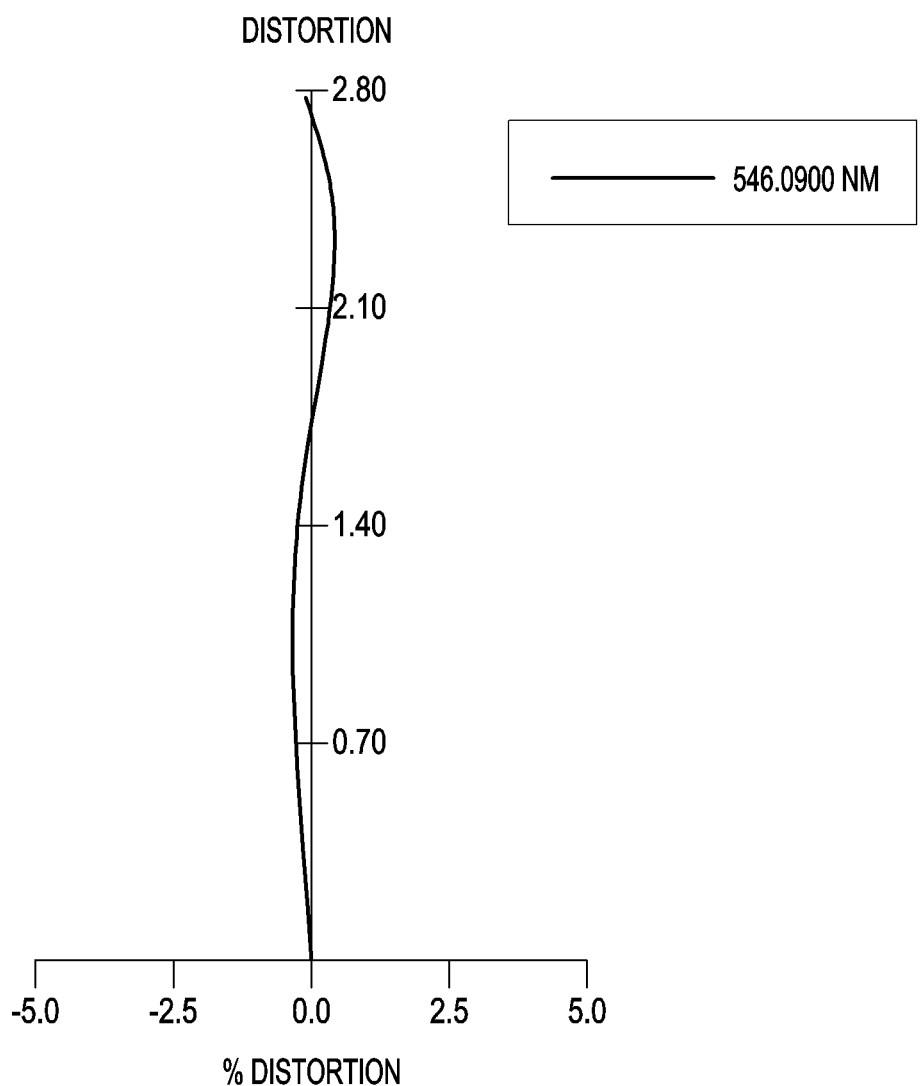
FIG. 12 is a graph illustrating the distortion of a lens assembly according to the embodiment of FIG. 9.

FIG. 9 is a view illustrating a configuration of a lens assembly 300 according to an embodiment. FIG. 10 is a graph illustrating the spherical aberration of a lens assembly 300 according to the embodiment of FIG. 9. FIG. 11 is a graph illustrating the astigmatism of a lens assembly 300 according to the embodiment of FIG. 9. FIG. 12 is a graph illustrating the distortion of a lens assembly 300 according to the embodiment of FIG. 9.

Referring to FIGS. 9 to 12, according to an embodiment, a lens assembly 300 may include a plurality of lenses (e.g., 301, 302, 303, 304, 309, 305, and 306), an image sensor 308, and/or a filter 307. The embodiment of FIGS. 9 to 12, unlike the above-described embodiments, may further include the lens 309. The added lens 309, along with the lens 305, may be included in the sixth lens.

Table 7 below may represent various lens data about the lens assembly 300 and Tables 8 and 9 below may show the respective aspheric coefficients of the plurality of lenses (e.g., 301, 302, 303, 304, 309, 305, and 306). The lens assembly 300 may have an F-number (F-No) of about 1.9883, a view angle (ANG) of about 50.1 degrees, and a focal length of about 5.9963 mm and may meet at least one or more of the above-described conditions.

TABLE 7

| Surf | Radius | Thick | H-Ape | EFL | nd | vd |
|---|---|---|---|---|---|---|
| obj* | infinity | infinity | | | | |
| S1* | 1.782 | 0.721 | 1.51 | 3.937 | 1.5441 | 56.09 |
| S2* | 8.876 | 0.097 | 1.435 | | | |
| S3* | 4.285 | 0.681 | 1.367 | 7.66 | 1.53516 | 55.72 |
| S4* | −99.193 | 0.246 | 1.246 | | | |
| S5* | −10.066 | 0.27 | 1.02 | −3.444 | 1.66074 | 20.37 |
| S6* | 3.016 | 0.336 | 0.8 | | | |
| S7* | −6.891 | 0.257 | 0.813 | 73.099 | 1.67074 | 19.23 |
| S8* | −6.142 | 0.198 | 0.967 | | | |
| S15* | −5.22 | 0.23 | 1.19 | −33.915 | 1.54682 | 53.4 |
| S16* | −7.366 | 0.454 | 1.328 | | | |
| S9* | 22.319 | 0.3 | 1.613 | −5.679 | 1.5348 | 55.71 |
| S10* | 2.671 | 0.251 | 1.832 | | | |
| S11* | 30.543 | 0.8 | 2.082 | 9.922 | 1.67074 | 19.23 |
| S12* | −8.55 | 0.099 | 2.204 | | | |
| S13 | infinity | 0.109 | 2.526 | infinity | 1.5168 | 64.2 |
| S14 | infinity | 0.628 | 2.553 | | | |
| img | infinity | | | | | |

TABLE 8

| Surf | K (Conic) | A (4th) | B (6th) | C (8th) | D (10th) |
|---|---|---|---|---|---|
| S1 | 4.94E−03 | −7.55E−03 | 1.01E−03 | −3.30E−03 | 1.13E−03 |
| S2 | 2.89E+01 | 4.35E−02 | −1.10E−02 | 2.02E−03 | −6.62E−04 |
| S3 | 5.52E+00 | 4.95E−02 | −5.49E−03 | −4.22E−03 | 4.73E−03 |
| S4 | −1.00E+00 | −5.38E−03 | 1.42E−02 | −7.76E−03 | 1.50E−03 |
| S5 | −1.00E+00 | 4.66E−02 | 5.28E−02 | −4.88E−02 | 1.58E−02 |
| S6 | 0.00E+00 | 4.72E−02 | 1.00E−01 | −9.54E−03 | −1.31E−01 |
| S7 | 0.00E+00 | −1.52E−01 | 6.75E−02 | −6.24E−02 | 1.48E−01 |
| S8 | 0.00E+00 | −8.14E−02 | 1.05E−01 | 2.37E−02 | −4.88E−03 |
| S15 | 0.00E+00 | −2.11E−02 | 3.97E−02 | 1.50E−02 | −5.33E−03 |
| S16 | 0.00E+00 | 6.00E−03 | 5.75E−03 | 1.95E−03 | −2.00E−03 |
| S9 | 0.00E+00 | −1.51E−01 | 7.18E−02 | −1.82E−02 | 4.84E−03 |
| S10 | 0.00E+00 | −1.67E−01 | 6.99E−02 | −2.51E−02 | 3.88E−03 |
| S11 | 0.00E+00 | −1.99E−02 | −1.07E−04 | 4.69E−04 | −8.36E−06 |
| S12 | −1.00E+00 | −4.69E−02 | 1.27E−02 | −3.22E−03 | 3.46E−04 |

TABLE 9

| Surf | K (Conic) | E (12th) | F (14th) | G (16th) | H (18th) |
|---|---|---|---|---|---|
| S1 | 4.94E−03 | −3.00E−04 | −1.01E−04 | 0.00E+00 | 0.00E+00 |
| S2 | 2.89E+01 | −2.16E−05 | −5.80E−05 | 0.00E+00 | 0.00E+00 |
| S3 | 5.52E+00 | −1.10E−03 | 0.00E+00 | 0.00E+00 | 0.00E+00 |
| S4 | −1.00E+00 | 0.00E+00 | 0.00E+00 | 0.00E+00 | 0.00E+00 |
| S5 | −1.00E+00 | 5.00E−03 | 0.00E+00 | 0.00E+00 | 0.00E+00 |
| S6 | 0.00E+00 | 1.72E−01 | 0.00E+00 | 0.00E+00 | 0.00E+00 |
| S7 | 0.00E+00 | −2.02E−01 | 0.00E+00 | 0.00E+00 | 0.00E+00 |
| S8 | 0.00E+00 | −2.25E−02 | 0.00E+00 | 0.00E+00 | 0.00E+00 |
| S15 | 0.00E+00 | −1.19E−02 | 5.38E−03 | −6.28E−04 | 0.00E+00 |
| S16 | 0.00E+00 | −5.37E−05 | −1.02E−11 | −9.75E−13 | 0.00E+00 |
| S9 | 0.00E+00 | −3.09E−03 | 1.18E−03 | −1.47E−04 | 0.00E+00 |
| S10 | 0.00E+00 | 5.88E−04 | −3.94E−04 | 5.30E−05 | 0.00E+00 |
| S11 | 0.00E+00 | −1.51E−05 | 1.17E−05 | −1.88E−06 | 0.00E+00 |
| S12 | −1.00E+00 | 4.31E−05 | −5.79E−06 | −3.69E−07 | 0.00E+00 |

Figure 14:
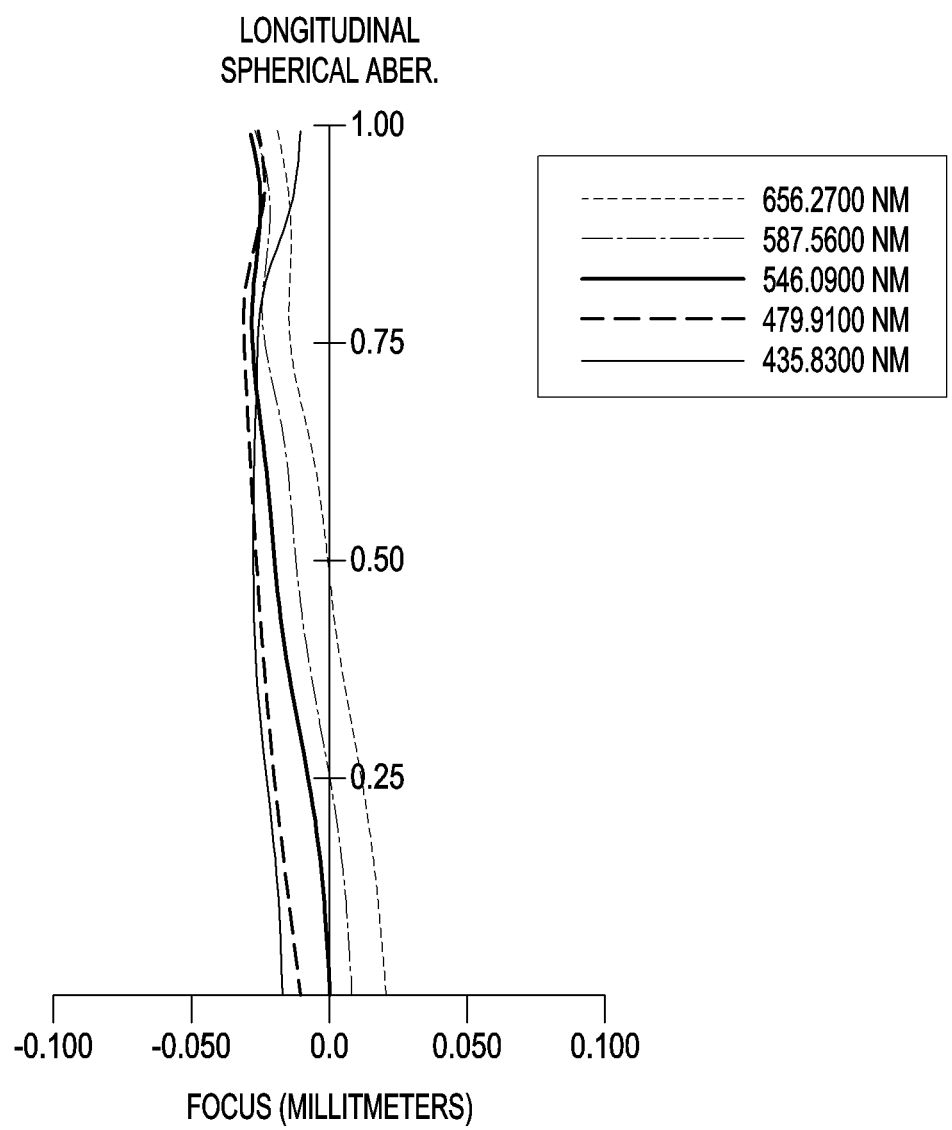
FIG. 14 is a graph illustrating the spherical aberration of a lens assembly according to the embodiment of FIG. 13.
Figure 15:
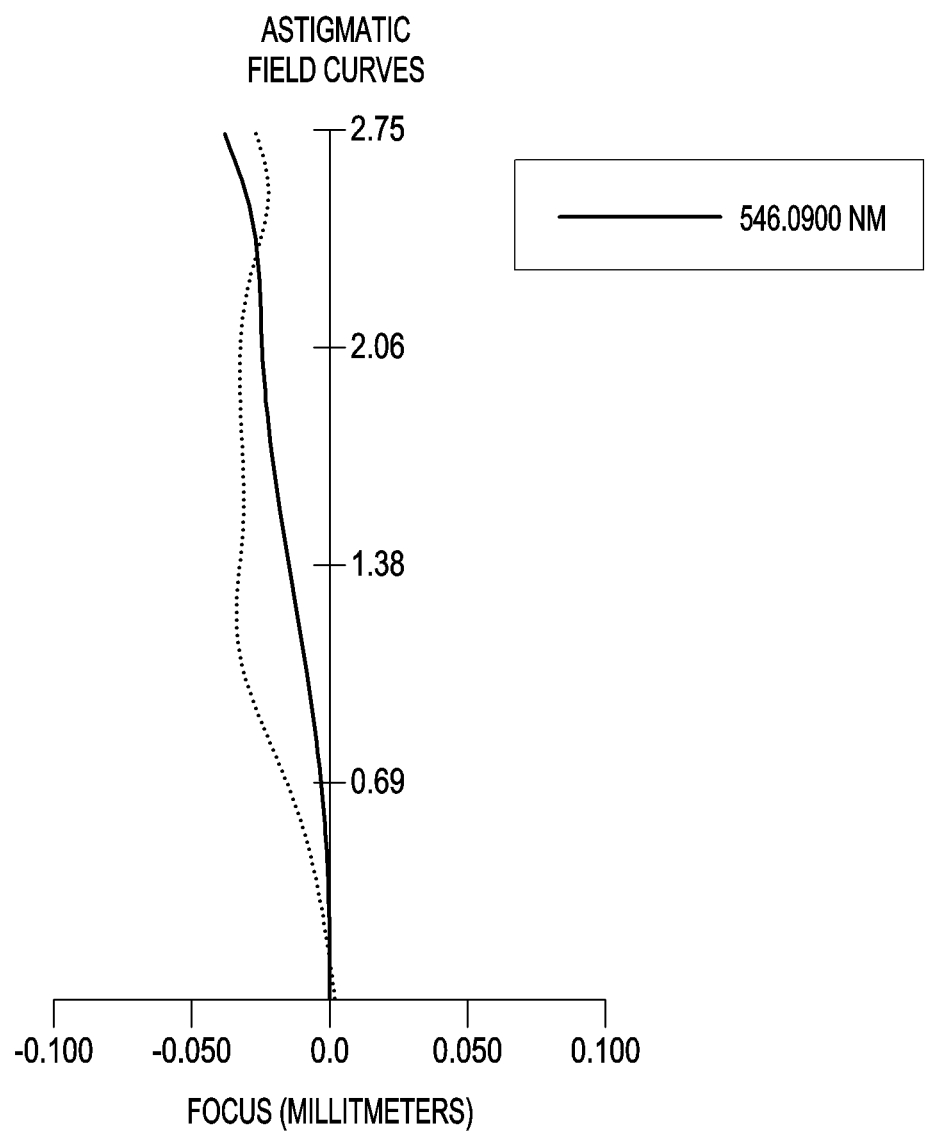
FIG. 15 is a graph illustrating the astigmatism of a lens assembly according to the embodiment of FIG. 13.
Figure 16:
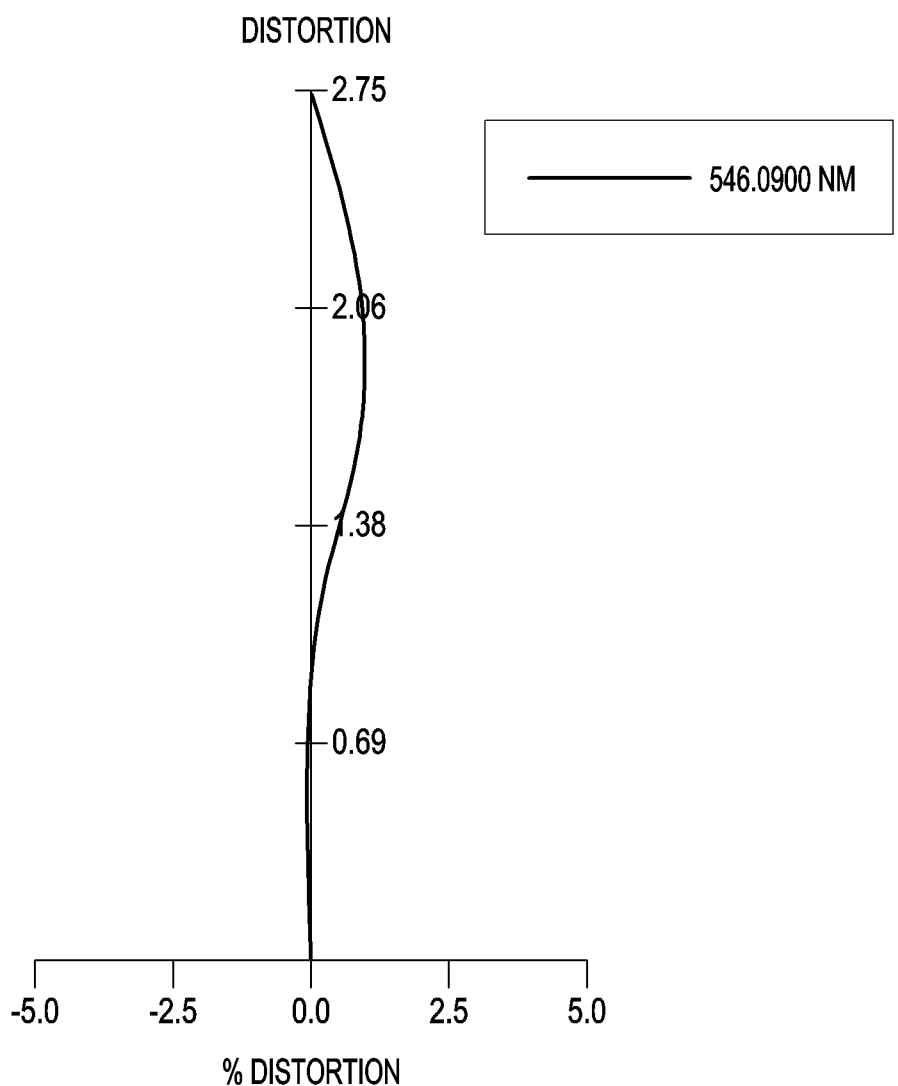
FIG. 16 is a graph illustrating the distortion of a lens assembly according to the embodiment of FIG. 13.

FIG. 13 is a view illustrating a configuration of a lens assembly 400 according to an embodiment. FIG. 14 is a graph illustrating the spherical aberration of a lens assembly 400 according to the embodiment of FIG. 13. FIG. 15 is a graph illustrating the astigmatism of a lens assembly 400 according to the embodiment of FIG. 13. FIG. 16 is a graph illustrating the distortion of a lens assembly 400 according to the embodiment of FIG. 13.

Referring to FIGS. 13 to 16, according to an embodiment, a lens assembly 400 may include a plurality of lenses (e.g., 401, 402, 403, 404, 405, and 406), an image sensor 408, and/or a filter 407.

According to an embodiment, the electronic device 400 may include at least one aperture 410. For example, the aperture 410 may be placed between the third lens 403 and the fourth lens 404 to adjust the amount of light. In addition, the lens assembly 400 may additionally or alternatively include another aperture (not shown) in another position.

Table 10 below may represent various lens data about the lens assembly 400. Table 11 below may show the respective aspheric coefficients of the plurality of lenses (e.g., 401, 402, 403, 404, 405, and 406). The lens assembly 400 may have an F-number (F-No) of about 1.816, a view angle (ANG) of about 49.7 degrees, and a focal length of about 5.98 mm and may meet at least one or more of the above-described conditions.

Unlike in the above-described embodiments, the image side (I)-facing surface S4 of the second lens 402, the object side (O)-facing surface S5 of the third lens 403, and the image side (I)-facing surface S12 of the fifth lens 406 may be spherical surfaces. Thus, unlike in the above-described embodiments, the aspheric coefficients of the surfaces S4, S5, and S12 may be omitted from Table 11 below.

TABLE 10

| Surf | Radius | Thick | H-Ape | EFL | nd | vd |
|---|---|---|---|---|---|---|
| obj | infinity | infinity | | | | |
| S1* | 1.943 | 0.796 | 1.7 | 7.296 | 1.5441 | 56.1 |
| S2* | 3.242 | 0.01 | 1.582 | | | |
| S3* | 1.864 | 0.743 | 1.45 | 4.459 | 1.5441 | 56.1 |
| S4 | 6.818 | 0.01 | 1.32 | | | |
| S5 | 3.896 | 0.23 | 1.234 | −4.115 | 1.65038 | 21.52 |
| S6* | 1.559 | 0.9 | 0.947 | | | |
| S7* | −3.463 | 0.23 | 1 | 21.659 | 1.65038 | 21.52 |
| S8* | −2.859 | 0.925 | 1.124 | | | |
| S9* | −5.078 | 0.25 | 1.677 | −14.467 | 1.5441 | 56.1 |
| S10* | −14.45 | 0.196 | 1.899 | | | |
| S11* | −2.801 | 0.559 | 2.143 | −12.696 | 1.65038 | 21.52 |
| S12 | −4.549 | 0.01 | 2.261 | | | |
| S13 | infinity | 0.11 | 2.506 | infinity | 1.5168 | 64.2 |
| S14 | infinity | 0.555 | 2.534 | | | |
| img | infinity | | | | | |

TABLE 11

| Surf | K(Conic) | A(4th) | B(6th) | C(8th) | D(10th) | E(12th) |
|---|---|---|---|---|---|---|
| S1 | 0.00E+00 | −3.33E−03 | 8.63E−04 | −9.12E−04 | 3.80E−04 | −8.36E−05 |
| S2 | 0.00E+00 | 1.90E−05 | −1.12E−04 | −2.64E−04 | −9.37E−05 | 5.00E−05 |
| S3 | 0.00E+00 | 3.84E−03 | −1.19E−03 | −1.05E−03 | 3.54E−06 | −8.37E−05 |
| S6 | 0.00E+00 | 3.86E−02 | 4.14E−02 | −2.96E−02 | 3.49E−02 | 1.25E−03 |
| S7 | 0.00E+00 | −1.29E−03 | −1.12E−03 | 4.35E−02 | −3.71E−02 | −2.06E−11 |
| S8 | 0.00E+00 | 9.97E−03 | 2.27E−02 | 1.73E−02 | −1.59E−02 | −2.76E−11 |
| S9 | 0.00E+00 | −6.87E−02 | 9.22E−03 | 1.68E−03 | 3.81E−04 | −1.61E−04 |
| S10 | 0.00E+00 | −6.75E−03 | 3.20E−03 | −4.45E−03 | 4.44E−04 | 1.73E−05 |
| S11 | 0.00E+00 | 9.49E−02 | −2.24E−02 | 1.44E−03 | 2.24E−04 | −2.47E−05 |

Figure 17:
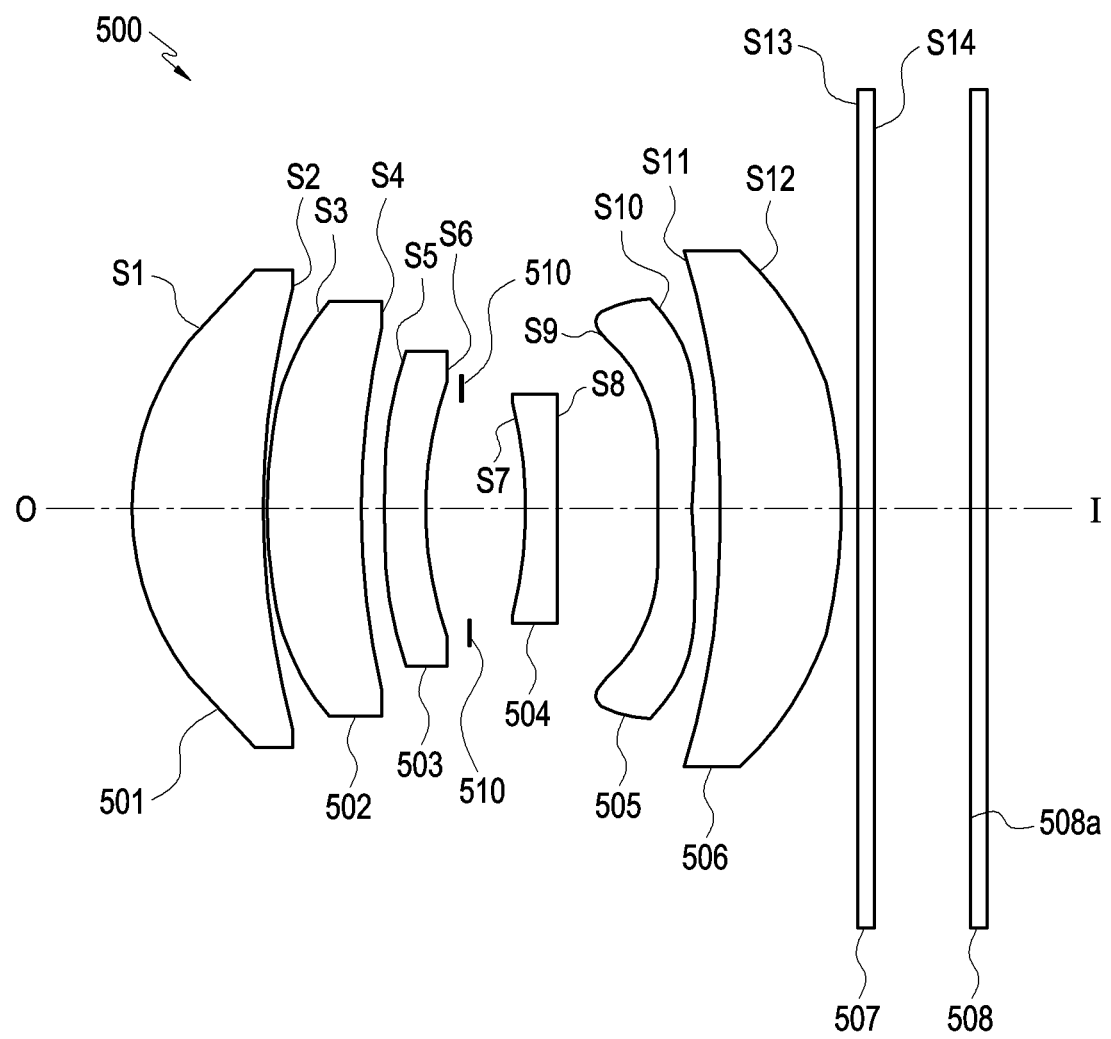
FIG. 17 is a view illustrating a configuration of a lens assembly according to an embodiment.
Figure 18:
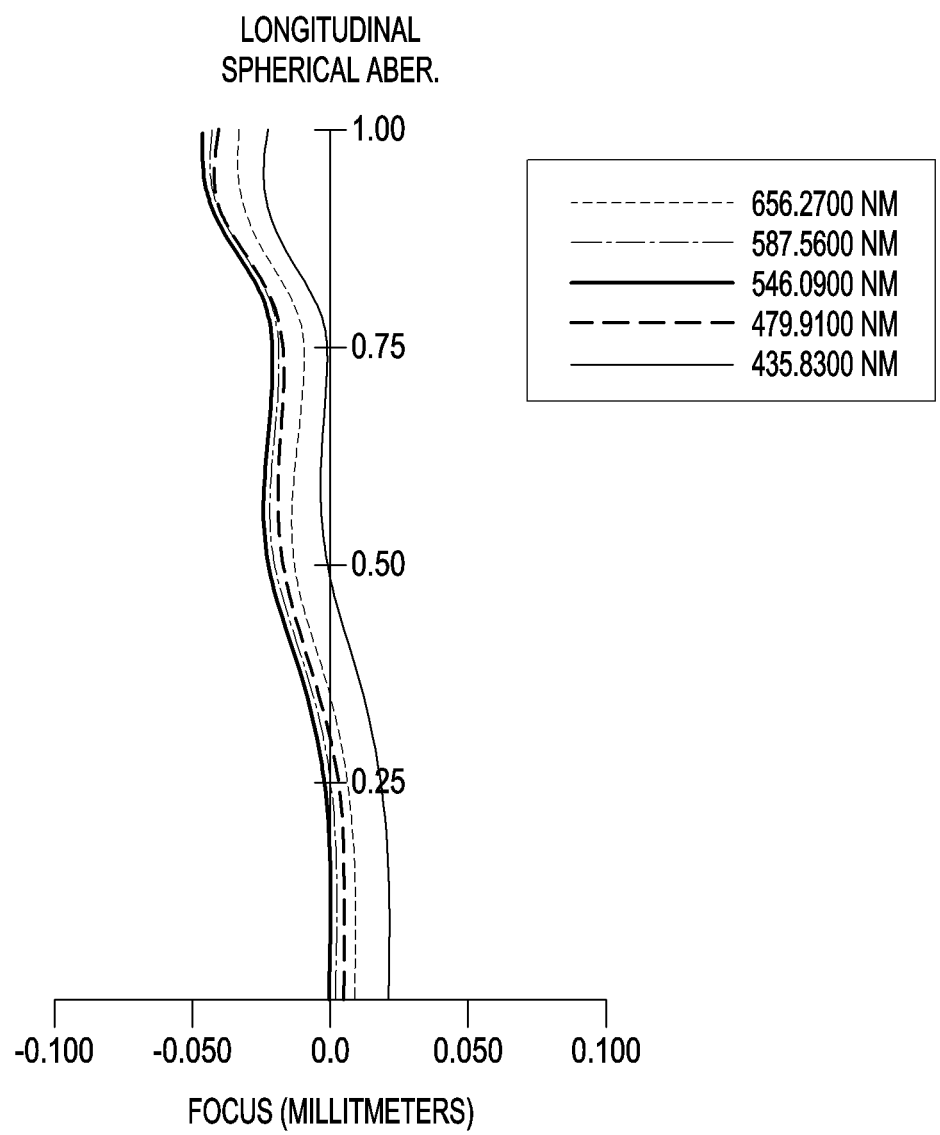
FIG. 18 is a graph illustrating the spherical aberration of a lens assembly according to the embodiment of FIG. 17.
Figure 19:
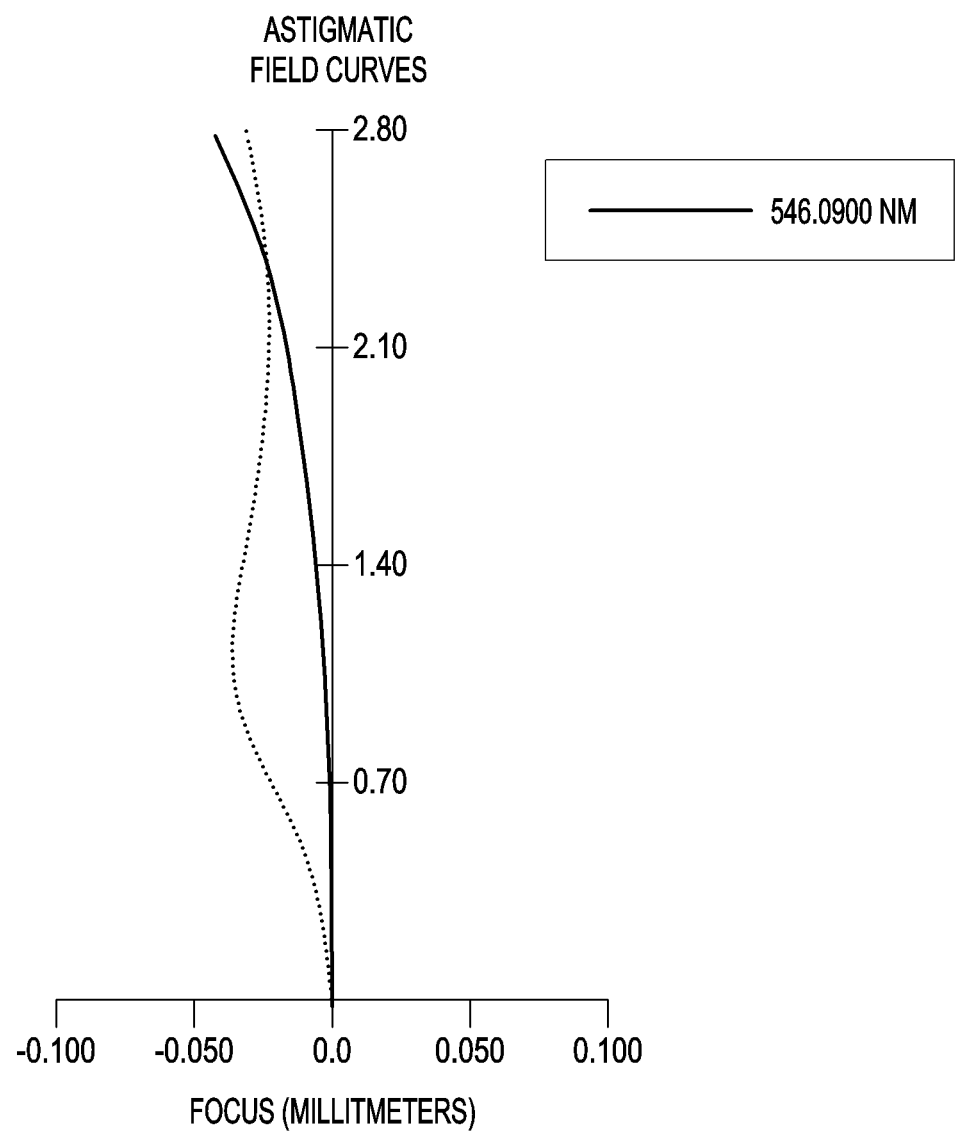
FIG. 19 is a graph illustrating the astigmatism of a lens assembly according to the embodiment of FIG. 17.
Figure 20:
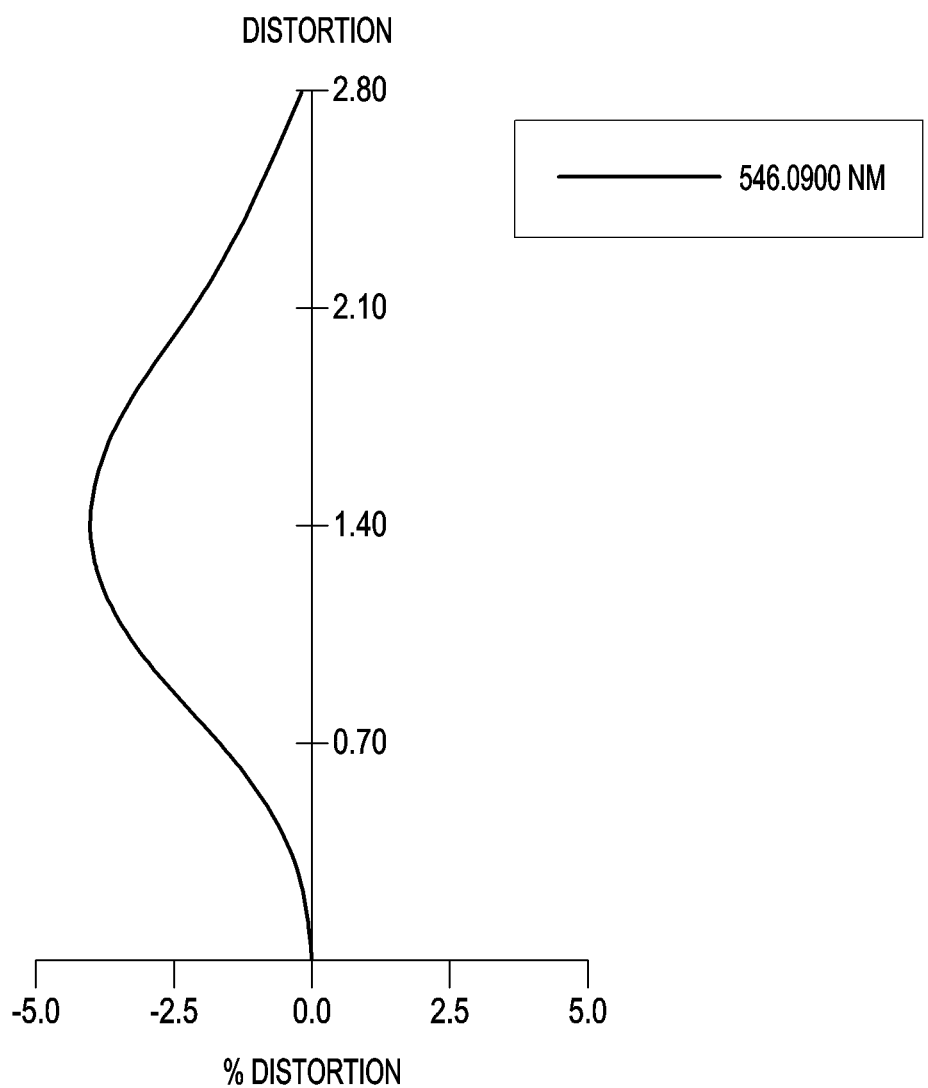
FIG. 20 is a graph illustrating the distortion of a lens assembly according to the embodiment of FIG. 17.

FIG. 17 is a view illustrating a configuration of a lens assembly 500 according to an embodiment. FIG. 18 is a graph illustrating the spherical aberration of a lens assembly 500 according to the embodiment of FIG. 17. FIG. 19 is a graph illustrating the astigmatism of a lens assembly 500 according to the embodiment of FIG. 17. FIG. 20 is a graph illustrating the distortion of a lens assembly 500 according to the embodiment of FIG. 17.

Referring to FIGS. 17 to 20, according to an embodiment, a lens assembly 500 may include a plurality of lenses (e.g., 501, 502, 503, 504, 505, and 506), an image sensor 508, and/or a filter 507.

Table 12 below may represent various lens data about the lens assembly 500 and Tables 13 and 14 below may show the respective aspheric coefficients of the plurality of lenses (e.g., 501, 502, 503, 504, 505, and 506). The lens assembly 500 may have an F-number (F-No) of about 2.417, a view angle (ANG) of about 41.4 degrees, and a focal length of about 6.6 mm and may meet at least one or more of the above-described conditions.

TABLE 12

| Surf obj | Radius infinity | Thick infinity | H-Ape | EFL | nd | vd |
|---|---|---|---|---|---|---|
| S1* | 1.695 | 0.883 | 1.6 | 3.909 | 1.51691 | 76.76 |
| S2* | 8.513 | 0.02 | 1.499 | | | |
| S3* | 4.118 | 0.637 | 1.381 | 17.643 | 1.50032 | 80.73 |
| S4* | 7.3 | 0.099 | 1.164 | | | |
| S5* | 6.607 | 0.268 | 1.051 | −9.504 | 1.66074 | 20.37 |
| S6* | 3.186 | 0.717 | 0.856 | | | |
| S7* | −5.244 | 0.22 | 0.723 | −6.91 | 1.67074 | 19.23 |
| S8* | 45.225 | 0.672 | 0.77 | | | |
| S9* | −172.104 | 0.22 | 1.452 | −4.095 | 1.755 | 52.32 |
| S10* | 3.164 | 0.188 | 1.708 | | | |
| S11* | −352.727 | 0.806 | 1.514 | 17.455 | 1.67074 | 19 |
| S12* | −11.478 | 0.11 | 1.692 | | | |
| S13 | infinity | 0.121 | 2.119 | infinity | 1.5168 | 64.2 |
| S14 | infinity | 0.563 | 2.161 | | | |
| img | infinity | | | | | |

TABLE 13

| Surf | K (Conic) | A (4th) | B (6th) | C (8th) | D (10th) |
|---|---|---|---|---|---|
| S1 | −5.80E−02 | −8.32E−03 | 8.96E−04 | −4.13E−03 | 1.45E−03 |
| S2 | 2.63E+01 | 3.92E−02 | −1.51E−02 | 1.07E−03 | −9.90E−04 |
| S3 | 5.07E+00 | 4.20E−02 | −6.91E−03 | −4.82E−03 | 5.26E−03 |
| S4 | −1.00E+00 | 8.09E−03 | 2.37E−02 | −1.26E−02 | −8.24E−04 |
| S5 | −1.00E+00 | 1.75E−02 | 5.85E−02 | −6.59E−02 | 3.90E−02 |
| S6 | 0.00E+00 | 7.39E−03 | 8.19E−02 | −7.26E−02 | 8.05E−03 |
| S7 | 0.00E+00 | −1.62E−01 | 1.91E−02 | 1.30E−01 | 1.76E−02 |
| S8 | 0.00E+00 | −1.03E−01 | 1.05E−01 | 1.70E−02 | 1.01E−01 |
| S9 | 0.00E+00 | −2.61E−01 | 3.52E−02 | −1.02E−02 | 9.61E−03 |
| S10 | 0.00E+00 | −2.35E−01 | 8.00E−02 | −3.04E−02 | 4.56E−03 |
| S11 | 0.00E+00 | −4.85E−02 | 2.67E−03 | 1.20E−03 | 4.47E−05 |
| S12 | −1.00E+00 | −1.42E−01 | 4.42E−02 | −6.16E−03 | −8.04E−05 |

TABLE 14

| Surf | K (Conic) | E (12th) | F (14th) | G (16th) | H (18th) |
|---|---|---|---|---|---|
| S1 | −5.80E−02 | −3.25E−04 | −1.56E−04 | 0.00E+00 | 0.00E+00 |
| S2 | 2.63E+01 | 5.33E−05 | 2.67E−06 | 0.00E+00 | 0.00E+00 |
| S3 | 5.07E+00 | −1.25E−03 | 0.00E+00 | 0.00E+00 | 0.00E+00 |
| S4 | −1.00E+00 | 0.00E+00 | 0.00E+00 | 0.00E+00 | 0.00E+00 |
| S5 | −1.00E+00 | −5.50E−03 | 0.00E+00 | 0.00E+00 | 0.00E+00 |
| S6 | 0.00E+00 | 6.49E−02 | 0.00E+00 | 0.00E+00 | 0.00E+00 |
| S7 | 0.00E+00 | −1.73E−01 | 0.00E+00 | 0.00E+00 | 0.00E+00 |
| S8 | 0.00E+00 | −9.24E−02 | 0.00E+00 | 0.00E+00 | 0.00E+00 |
| S9 | 0.00E+00 | −4.35E−03 | 2.12E−03 | 2.20E−03 | 0.00E+00 |
| S10 | 0.00E+00 | 1.04E−03 | −4.32E−04 | 3.28E−05 | 0.00E+00 |
| S11 | 0.00E+00 | 4.21E−05 | 2.57E−05 | −9.43E−06 | 0.00E+00 |
| S12 | −1.00E+00 | 1.46E−05 | −6.04E−08 | 6.04E−06 | 0.00E+00 |

From the above-described embodiments, various data about lenses may be identified in the lens assemblies (e.g., 100, 200, 300, 400, and 500) and/or an electronic device including the lens assemblies (e.g., 100, 200, 300, 400, and 500). Such data may meet the above-described conditions, e.g., the results of Equations 1 to 9.

TABLE 15

| Equation | First embodiment | Second embodiment | Third embodiment | Fourth embodiment | Fifth embodiment |
|---|---|---|---|---|---|
| [Equation 1] $8 < \frac{TTL}{\tan\theta} < 25$ | 13.198 | 12.185 | 12.127 | 11.887 | 14.548 |
| [Equation 2] $0.3 < \frac{Sag\_13}{Y} < 0.8$ | 0.557 | 0.414 | 0.407 | 0.593 | 0.496 |

TABLE 15-continued

| Equation | | First embodiment | Second embodiment | Third embodiment | Fourth embodiment | Fifth embodiment |
|---|---|---|---|---|---|---|
| [Equation 3] | $0.2 < \dfrac{ET1 + ET2}{CT1 + CT2} < 0.45$ | 0.323 | 0.365 | 0.364 | 0.286 | 0.402 |
| [Equation 4] | $0.23 < \dfrac{D_{S1}}{TTL} < 0.8$ | 0.589 | 0.543 | 0.533 | 0.618 | 0.582 |
| [Equation 5] | $-1.5 < \dfrac{f_{air}}{efl} < -0.2$ | −0.718 | −0.905 | −0.855 | −0.406 | −0.709 |
| [Equation 6] | $45 < Vd\_p < 80$ | 56 | 55.84 | 55.9 | 56.1 | 78.75 |
| [Equation 7] | $15 < Vd\_n < 30$ | 19.8 | 19.8 | 19.8 | 21.5 | 19.8 |
| [Equation 8] | $15 < Vd\_pL < 30$ | 21.52 | 19.23 | 19.23 | 21.52 | 19 |
| [Equation 9] | $40 < Vd\_nL < 65$ | 56.09 | 55.74 | 55.71 | 56.1 | 52.32 |

In Table 15 above, "First embodiment," "Second embodiment," "Third embodiment," "Fourth embodiment," and "Fifth embodiment" may mean the lens assembly 100 of FIG. 1B, the lens assembly 200 of FIG. 5, the lens assembly 300 of FIG. 9, the lens assembly 400 of FIG. 13, and the lens assembly 500 of FIG. 17, respectively.

The above-described lens assembly (e.g., 100, 200, 300, 400, or 500) may be equipped in an electronic device (e.g., an optical device). In addition to the image sensor 108, 208, 308, 408, or 508, the electronic device (e.g., an optical device) may further include an application processor (AP) and drive an operating system (OS) or application programs through the application processor (AP) to thereby control multiple hardware or software components connected with the AP 21 and to perform processing and computation on various data. As an example, the application processor (AP) may further include a graphic processing unit (GPU) and/or an image signal processor. When the application processor (AP) includes an image signal processor, the image (or video) obtained by the image sensor (e.g., 108, 208, 308, 408, or 508) may be stored or output by way of the application processor.

Figure 21:
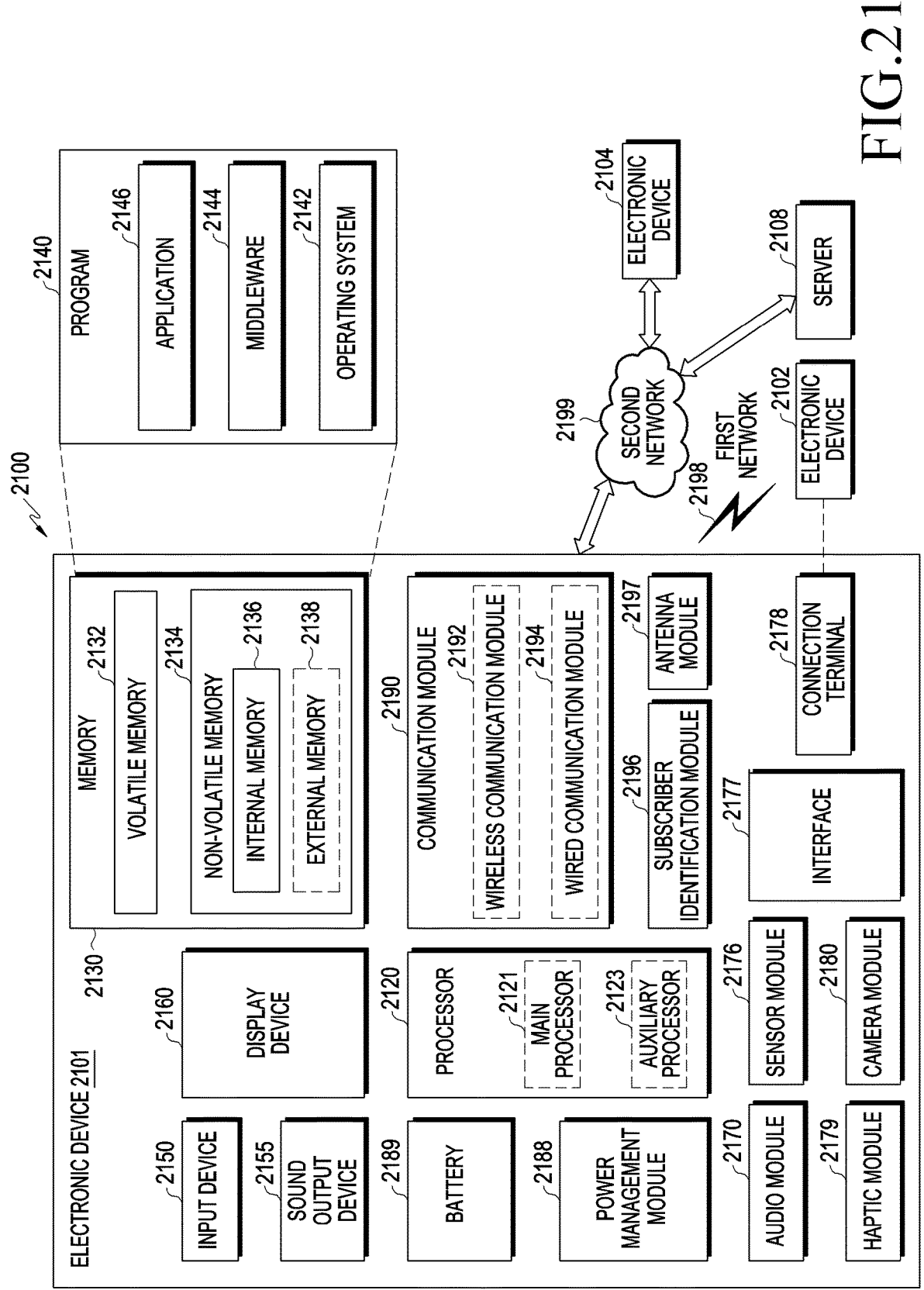
FIG. 21 is a block diagram illustrating an electronic device in a network environment according to an embodiment.

FIG. 21 is a block diagram illustrating an electronic device 2101 (e.g., an optical device) in a network environment 2100 according to an embodiment. Referring to FIG. 21, the electronic device 2101 (e.g., an optical device) in the network environment 2100 may communicate with an electronic device 2102 via a first network 2198 (e.g., a short-range wireless communication network), or an electronic device 2104 or a server 2108 via a second network 2199 (e.g., a long-range wireless communication network). According to an embodiment, the electronic device 2101 may communicate with the electronic device 2104 via the server 2108. According to an embodiment, the electronic device 2101 may include a processor 2120, memory 2130, an input device 2150, a sound output device 2155, a display device 2160, an audio module 2170, a sensor module 2176, an interface 2177, a haptic module 2179, a camera module 2180, a power management module 2188, a battery 2189, a communication module 2190, a subscriber identification module (SIM) 2196, or an antenna module 2197. In some embodiments, at least one (e.g., the display device 2160 or the camera module 2180) of the components may be omitted from the electronic device 2101, or one or more other components may be added in the electronic device 101. In some embodiments, some of the components may be implemented as single integrated circuitry. For example, the sensor module 2176 (e.g., a fingerprint sensor, an iris sensor, or an illuminance sensor) may be implemented as embedded in the display device 2160 (e.g., a display).

The processor 2120 may execute, e.g., software (e.g., a program 2140) to control at least one other component (e.g., a hardware or software component) of the electronic device 2101 connected with the processor 2120 and may process or compute various data. According to one embodiment, as at least part of the data processing or computation, the processor 2120 may load a command or data received from another component (e.g., the sensor module 2176 or the communication module 2190) in volatile memory 2132, process the command or the data stored in the volatile memory 2132, and store resulting data in non-volatile memory 2134. According to an embodiment, the processor 2120 may include a main processor 2121 (e.g., a central processing unit (CPU) or an application processor (AP)), and an auxiliary processor 2123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 2123 may be adapted to consume less power than the main processor 2121, or to be specific to a specified function. The auxiliary processor 2123 may be implemented as separate from, or as part of the main processor 2121.

The auxiliary processor 2123 may control at least some of functions or states related to at least one (e.g., the display device 2160, the sensor module 2176, or the communication module 2190) of the components of the electronic device 2101, instead of the main processor 2121 while the main processor 2121 is in an inactive (e.g., sleep) state or along with the main processor 2121 while the main processor 2121 is an active state (e.g., executing an application). According to an embodiment, the auxiliary processor 2123 (e.g., an image signal processor or a communication processor) may be implemented as part of another component (e.g., the camera module 2180 or the communication module 2190) functionally related to the auxiliary processor 123.

The memory 2130 may store various data used by at least one component (e.g., the processor 2120 or the sensor module 2176) of the electronic device 2101. The various data may include, for example, software (e.g., the program 2140) and input data or output data for a command related thereto. The memory 2130 may include the volatile memory 2132 or the non-volatile memory 2134.

The program 2140 may be stored in the memory 2130 as software, and may include, for example, an operating system (OS) 2142, middleware 2144, or an application 2146.

The input device 2150 may receive a command or data to be used by other component (e.g., the processor 2120) of the electronic device 2101, from the outside (e.g., a user) of the electronic device 2101. The input device 2150 may include, for example, a microphone, a mouse, a keyboard, or a digital pen (e.g., a stylus pen).

The sound output device 2155 may output sound signals to the outside of the electronic device 2101. The sound output device 2155 may include, for example, a speaker or a receiver. The speaker may be used for general purposes, such as playing multimedia or playing recordings, and the receiver may be used for an incoming calls. According to an embodiment, the receiver may be implemented as separate from or as part of the speaker.

The display device 2160 may visually provide information to the outside (e.g., a user) of the electronic device 2101. The display device 2160 may include, for example, a display, a hologram device, or a projector and control circuitry to control a corresponding one of the display, hologram device, and projector. According to an embodiment, the display device 2160 may include touch circuitry adapted to detect a touch, or sensor circuitry (e.g., a pressure sensor) adapted to measure the intensity of force incurred by the touch.

The audio module 2170 may convert a sound into an electrical signal and vice versa. According to an embodiment, the audio module 2170 may obtain a sound through the input device 2150 or output a sound through the sound output device 2155 or an external electronic device (e.g., an electronic device 2102 (e.g., a speaker or a headphone)) directly or wirelessly connected with the electronic device 2101.

The sensor module 2176 may detect an operational state (e.g., power or temperature) of the electronic device 2101 or an environmental state (e.g., a state of a user) external to the electronic device 101, and then generate an electrical signal or data value corresponding to the detected state. According to an embodiment, the sensor module 2176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2177 may support one or more specified protocols to be used for the electronic device 2101 to be coupled with the external electronic device (e.g., the electronic device 2102) directly (e.g., wiredly) or wirelessly. According to an embodiment, the interface 2177 may include, for example, a high definition multimedia interface (HDMI), a universal serial bus (USB) interface, a secure digital (SD) card interface, or an audio interface.

A connecting terminal 2178 may include a connector via which the electronic device 2101 may be physically connected with the external electronic device (e.g., the electronic device 2102). According to an embodiment, the connecting terminal 2178 may include, for example, a HDMI connector, a USB connector, a SD card connector, or an audio connector (e.g., a headphone connector).

The haptic module 2179 may convert an electrical signal into a mechanical stimulus (e.g., a vibration or motion) or electrical stimulus which may be recognized by a user via his or her tactile sensation or kinesthetic sensation. According to an embodiment, the haptic module 2179 may include, for example, a motor, a piezoelectric element, or an electric stimulator.

The camera module 2180 may capture a still image or moving images. According to an embodiment, the camera module 2180 may include one or more lenses, image sensors, image signal processors, or flashes.

The power management module 2188 may manage power supplied to the electronic device 2101. According to one embodiment, the power management module 388 may be implemented as at least part of, for example, a power management integrated circuit (PMIC).

The battery 2189 may supply power to at least one component of the electronic device 2101. According to an embodiment, the battery 2189 may include, for example, a primary cell which is not rechargeable, a secondary cell which is rechargeable, or a fuel cell.

The communication module 2190 may support establishing a direct (e.g., wired) communication channel or wireless communication channel between the electronic device 2101 and an external electronic device (e.g., the electronic device 2102, the electronic device 2104, or the server 2108) and performing communication through the established communication channel. The communication module 2190 may include one or more communication processors that are operable independently from the processor 2120 (e.g., the application processor (AP)) and supports a direct (e.g., wired) communication or a wireless communication. According to an embodiment, the communication module 2190 may include a wireless communication module 2192 (e.g., a cellular communication module, a short-range wireless communication module, or a global navigation satellite system (GNSS) communication module) or a wired communication module 2194 (e.g., a local area network (LAN) communication module or a power line communication (PLC) module). A corresponding one of these communication modules may communicate with the external electronic device via the first network 2198 (e.g., a short-range communication network, such as Bluetooth™, wireless-fidelity (Wi-Fi) direct, or infrared data association (IrDA)) or the second network 2199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2192 may identify and authenticate the electronic device 2101 in a communication network, such as the first network 2198 or the second network 2199, using subscriber information (e.g., international mobile subscriber identity (IMSI)) stored in the subscriber identification module 2196.

The antenna module 2197 may transmit or receive a signal or power to or from the outside (e.g., the external electronic device) of the electronic device 101. According to an embodiment, the antenna module may include one antenna including a radiator formed of a conductor or conductive pattern formed on a substrate (e.g., a printed circuit board (PCB)). According to an embodiment, the antenna module 2197 may include a plurality of antennas. In this case, at least one antenna appropriate for a communication scheme used in a communication network, such as the first network 2198 or the second network 2199, may be selected from the plurality of antennas by, e.g., the communication module 2190. The signal or the power may then be transmitted or received between the communication module 2190 and the external electronic device via the selected at least one antenna. According to an embodiment, other parts (e.g., radio frequency integrated circuit (RFIC)) than the radiator may be further formed as part of the antenna module 2197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2101 and the external electronic device 2104 via the server 2108 coupled with the second network 2199. The first and second external electronic devices 2102 and 2104 each may be a device of the same or a different type from the electronic device 2101. According to an embodiment, all or some of operations to be executed at the electronic device 2101 may be executed at one or more of the external electronic devices 2102, 2104, or 2108. For example, if the electronic device 2101 should perform a function or a service automatically, or in response to a request from a user or another device, the electronic device 2101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2101. The electronic device 2101 may provide the outcome, with or without further processing of the outcome, as at least part of a reply to the request. To that end, a cloud computing, distributed computing, or client-server computing technology may be used, for example.

Figure 22:
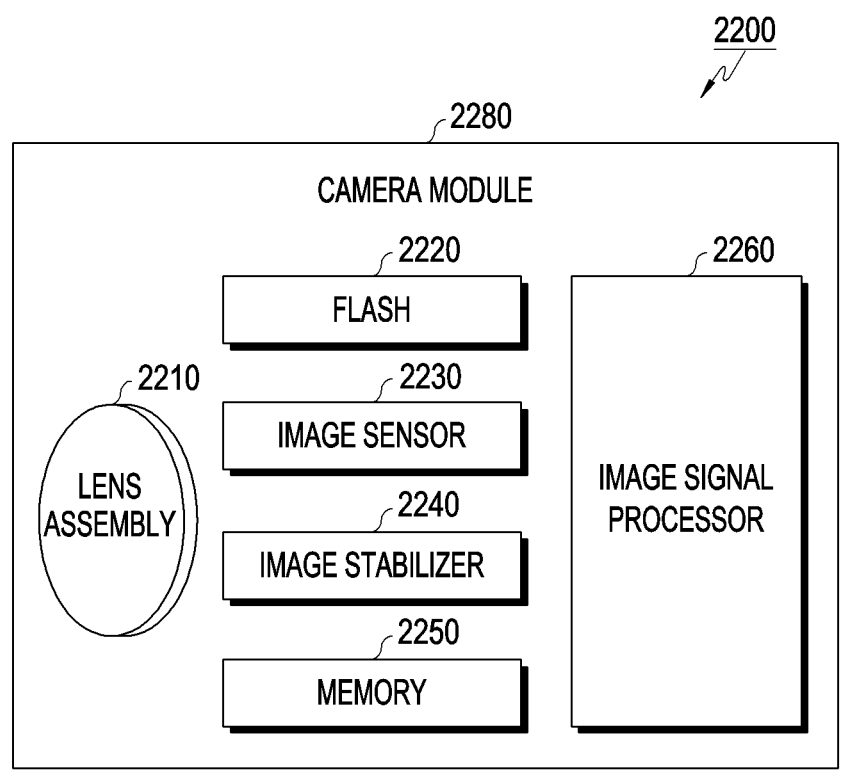
FIG. 22 is a block diagram illustrating a camera module according to an embodiment.

FIG. 22 is a block diagram 2200 illustrating the camera module 2180 according to various embodiments. Referring to FIG. 22, the camera module 2180 may include a lens assembly 2210 (e.g., 100 of FIGS. 1A and 1B, 200 of FIG. 5, 300 of FIG. 9, 400 of FIG. 13, or 500 of FIG. 17), a flash 2220, an image sensor 2230 (e.g., 108 of FIGS. 1A and 1B, 208 of FIG. 5, 308 of FIG. 9, 408 of FIG. 13, or 508 of FIG. 17), an image stabilizer 2240, a memory 2250 (e.g., a buffer memory) (e.g., 2130 of FIG. 21), or an image signal processor 2260. The lens assembly 2210 may collect light emitted or reflected from an object whose image is to be taken. The lens assembly 2210 may include one or more lenses. According to an embodiment, the camera module 2180 may include a plurality of lens assemblies 2210. In such a case, the camera module 2180 may form, for example, a dual camera, a 360-degree camera, or a spherical camera. Some of the plurality of lens assemblies 2210 may have the same lens attribute (e.g., view angle, focal length, auto-focusing, f number, or optical zoom), or at least one lens assembly may have one or more lens attributes different from those of another lens assembly. The lens assembly 2210 may include, for example, a wide-angle lens or a telephoto lens.

The flash 2220 may emit light that is used to reinforce light reflected from an object. According to an embodiment, the flash 2220 may include one or more light emitting diodes (LEDs) (e.g., a red-green-blue (RGB) LED, a white LED, an infrared (IR) LED, or an ultraviolet (UV) LED) or a xenon lamp. The image sensor 2230 may obtain an image corresponding to an object by converting light emitted or reflected from the object and transmitted via the lens assembly 2210 into an electrical signal. According to an embodiment, the image sensor 2230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 2230 may be implemented using, for example, a charged coupled device (CCD) sensor or a complementary metal oxide semiconductor (CMOS) sensor.

The image stabilizer 2240 may move the image sensor 2230 or at least one lens included in the lens assembly 2210 in a particular direction or control an operational attribute (e.g., adjust the read-out timing) of the image sensor 2230 in response to the movement of the camera module 2180 or the electronic device 2101 including the camera module 2180. This allows compensating for at least part of a negative effect (e.g., image blurring) by the movement on an image being captured. According to an embodiment, the image stabilizer 2240 may sense such a movement by the camera module 2180 or the electronic device 2101 using a gyro sensor (not shown) or an acceleration sensor (not shown) disposed inside or outside the camera module 2180. According to an embodiment, the image stabilizer 2240 may be implemented, for example, as an optical image stabilizer. The memory 2250 may store, at least temporarily, at least part of an image obtained via the image sensor 2230 for a subsequent image processing task. For example, if image capturing is delayed due to shutter lag or multiple images are quickly captured, a raw image obtained (e.g., a Bayer-patterned image or a high-resolution image) may be stored in the memory 2250, and its corresponding copy image (e.g., a low-resolution image) may be previewed via the display device 2160. Thereafter, if a specified condition is met (e.g., by a user's input or system command), at least part of the raw image stored in the memory 2250 may be obtained and processed, for example, by the image signal processor 2260. According to an embodiment, the memory 2250 may be configured as at least part of the memory 2130 or as a separate memory that is operated independently from the memory 130.

The image signal processor 2260 may perform one or more image processing with respect to an image obtained via the image sensor 2230 or an image stored in the memory 2250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 2260 may perform control (e.g., exposure time control or read-out timing control) with respect to at least one (e.g., the image sensor 2230) of the components included in the camera module 2180. An image processed by the image signal processor 2260 may be stored back in the memory 2250 for further processing, or may be transferred to an external component (e.g., the memory 2130, the display device 2160, the electronic device 2102, the electronic device 2104, or the server 2108) outside the camera module 2180. According to an embodiment, the image signal processor 2260 may be configured as at least part of the processor 2120, or as a separate processor that is operated independently from the processor 2120. If the image signal processor 2260 is configured as a separate processor from the processor 2120, at least one image processed by the image signal processor 2260 may be displayed, by the processor 2120, via the display device 2160 as it is or after being further processed.

According to an embodiment, the electronic device 2101 may include a plurality of camera modules 2180 having different attributes or functions. In such a case, at least one of the plurality of camera modules 2180 may form, for example, a wide-angle camera and at least another of the plurality of camera modules 2180 may form a telephoto camera. Similarly, at least one of the plurality of camera modules 2180 may form, for example, a front camera and at least another of the plurality of camera modules 2180 may form a rear camera.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2140) including one or more instructions that are stored in a storage medium (e.g., internal memory 2136 or external memory 2138) that is readable by a machine (e.g., the electronic device 2101). For example, a processor (e.g., the processor 2120) of the machine (e.g., the electronic device 2101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments of the disclosure, the lens assembly includes a small number (e.g., five) of lenses but may achieve a sufficient telephoto ratio and a wide angle to thereby obtain high-resolution, brighter images.

As equipped with a small number of lenses, the lens assembly may be slimmed down (e.g., miniaturized along the optical axis), allowing itself to be easily equipped in a compact electronic device.

While the disclosure has been shown and described with reference to exemplary embodiments thereof, it will be apparent to those of ordinary skill in the art that various changes in form and detail may be made thereto without departing from the spirit and scope of the disclosure as defined by the following claims. For example, the measurements of the plurality of lenses may be properly set depending on the structure, specifications, or actual use environment of the lens assembly as actually manufactured or an electronic device equipped with the lens assembly.

What is claimed is:

1. A lens assembly, comprising:
a first lens having a positive refractive power, the first lens having a convex surface in a first direction;
a second lens having a positive refractive power, the second lens having a convex surface in the first direction;
a third lens having a negative refractive power, the third lens having a concave surface in a second direction opposite to the first direction;
a fourth lens having a concave surface in the first direction and disposed to face the concave surface of the third lens; and
a fifth lens having a positive refractive power, the fifth lens having a convex surface in the second direction,
wherein the lens assembly meets Equation 1 and Equation 2 as follows:

$$8 < \frac{TTL}{\operatorname{Tan}\theta} < 25 \quad \text{[Equation 1]}$$

$$0.3 < \frac{\text{Sag\_13}}{Y} < 0.8 \quad \text{[Equation 2]}$$

wherein TTL is a whole length of the lens assembly, θ is a half view angle of the lens assembly, Sag_13 is a sum of an effective distance on a sagittal plane of the first lens and an effective distance on a sagittal plane of the second lens, and Y is half of a diagonal length of an image sensor configured to detect an object image which is sequentially transmitted through the first lens, the second lens, the third lens, the fourth lens, and the fifth lens.

2. The lens assembly of claim 1, further comprising a sixth lens having a negative refractive power, the sixth lens having a concave surface in the second direction.

3. The lens assembly of claim 1, wherein the first lens and the second lens meet Equation 3 as follows:

$$0.2 < \frac{ET1 + ET2}{CT1 + CT2} < 0.45 \quad \text{[Equation 3]}$$

wherein ET1 is a thickness of one end of a marginal portion of the first lens, ET2 is a thickness of one end of a marginal portion of the second lens, CT1 is a thickness of a chief portion of the first lens, and CT2 is a thickness of a chief portion of the second lens.

4. The lens assembly of claim 1, wherein the first lens meets Equation 4 as follows:

$$0.23 < \frac{D_{S1}}{TTL} < 0.8 \quad \text{[Equation 4]}$$

wherein Ds1 is an effective diameter of the first lens.

5. The lens assembly of claim 1, wherein the third lens and the fourth lens meet Equation 5 as follows:

$$-1.5 < \frac{f_{air}}{efl} < -0.2 \quad \text{[Equation 5]}$$

wherein $f_{air}$ is a composite focal length of the third lens and the fourth lens, and efl is a composite focal length of the lens assembly.

6. The lens assembly of claim 1, wherein the first lens and the second lens meet Equation 6 as follows:

$$45 < Vd\_p < 80 \quad \text{[Equation 6], and}$$

the third lens and the fourth lens meet Equation 7 as follows:

$$15 < Vd\_n < 30 \quad \text{[Equation 7]}$$

wherein Vd_p is a mean of Abbe numbers of the first lens and the second lens, and Vd_n is a mean of Abbe numbers of the third lens and the fourth lens.

7. The lens assembly of claim 2, wherein the fifth lens meets Equation 8 as follows:

$$15 < Vd\_pL < 30 \quad \text{[Equation 8], and}$$

the sixth lens meets Equation 9 as follows:

$$40 < Vd\_nL < 65 \quad \text{[Equation 9]}$$

wherein Vd_pL is Abbe number of the fifth lens, and Vd_nL is Abbe number of the sixth lens.

8. The lens assembly of claim 1, wherein an effective diameter of the first lens is larger than an effective diameter of the second lens, and the effective diameter of the second lens is larger than an effective diameter of the third lens.

9. The lens assembly of claim 2, wherein the fifth lens and/or the sixth lens includes at least one aspheric surface.

10. The lens assembly of claim 2, wherein an aspheric surface of the fifth lens or the sixth lens includes an inflection point.

11. An electronic device, comprising:
a lens assembly having a plurality of lenses;
an image sensor; and
an image signal processor configured to store or output an image obtained by the image sensor based on light transmitted sequentially through the plurality of lenses,
wherein the lens assembly includes a first lens having a positive refractive power, the first lens having a convex surface in a first direction, a second lens having a positive refractive power, the second lens having a convex surface in the first direction, a third lens having a negative refractive power, the third lens having a concave surface in a second direction opposite to the first direction, a fourth lens having a concave surface in the first direction and disposed to face the concave surface of the third lens, and a fifth lens having a positive refractive power, the fifth lens having a convex surface in the second direction, and wherein the lens assembly meets Equation 1 and Equation 2 as follows:

$$8 < \frac{TTL}{\tan\theta} < 25 \quad \text{[Equation 1]}$$

$$0.3 < \frac{Sag\_13}{Y} < 0.8 \quad \text{[Equation 2]}$$

wherein TTL is a whole length of the lens assembly, θ is a half view angle of the lens assembly, Sag_13 is a sum of an effective distance on a sagittal plane of the first lens and an effective distance on a sagittal plane of the second lens, and Y is half of a diagonal length of the image sensor.

12. The electronic device of claim 11, further comprising a sixth lens having a negative refractive power, the sixth lens having a concave surface in the second direction.

13. The electronic device of claim 11, wherein the first lens and the second lens meet Equation 3 as follows:

$$0.2 < \frac{ET1 + ET2}{CT1 + CT2} < 0.45 \quad \text{[Equation 3]}$$

wherein ET1 is a thickness of one end of a marginal portion of the first lens, ET2 is a thickness of one end of a marginal portion of the second lens, CT1 is a thickness of a chief portion of the first lens, and CT2 is a thickness of a chief portion of the second lens.

14. The electronic device of claim 11, wherein the first lens meets Equation 4 as follows:

$$0.23 < \frac{D_{S1}}{TTL} < 0.8 \quad \text{[Equation 4]}$$

wherein $D_{S1}$ is an effective diameter of the first lens.

15. The electronic device of claim 11, wherein the third lens and the fourth lens meet Equation 5 as follows:

$$-1.5 < \frac{f_{air}}{efl} < -0.2 \quad \text{[Equation 5]}$$

wherein $f_{air}$ is a composite focal length of the third lens and the fourth lens, and efl is a composite focal length of the lens assembly.

16. The electronic device of claim 11, wherein the first lens and the second lens meet Equation 6 as follows:

$$45 < Vd\_p < 80 \quad \text{[Equation 6], and}$$

the third lens and the fourth lens meet Equation 7 as follows:

$$15 < Vd\_n < 30 \quad \text{[Equation 7]}$$

wherein Vd_p is a mean of Abbe numbers of the first lens and the second lens, and Vd_n is a mean of Abbe numbers of the third lens and the fourth lens.

17. The electronic device of claim 12, wherein the fifth lens meets Equation 8 as follows:

$$15 < Vd\_pL < 30 \quad \text{[Equation 8], and}$$

the sixth lens meets Equation 9 as follows:

$$40 < Vd\_nL < 65 \quad \text{[Equation 9]}$$

wherein Vd_pL is Abbe number of the fifth lens, and Vd_nL is Abbe number of the sixth lens.

18. The electronic device of claim 11, wherein an effective diameter of the first lens is larger than an effective diameter of the second lens, and the effective diameter of the second lens is larger than an effective diameter of the third lens.

19. The electronic device of claim 12, wherein the fifth lens and/or the sixth lens includes at least one aspheric surface.

20. The electronic device of claim 12, wherein an aspheric surface of the fifth lens or the sixth lens includes an inflection point.

* * * * *